Jan. 19, 1954   H. H. VANDERZEE ET AL   2,666,649
RECORD CHANGER
Filed Oct. 21, 1946   16 Sheets-Sheet 1

Inventors:
H. Herbert Vanderzee
Robert A. McCallum
By Clarence A. Loftus  Atty.

Jan. 19, 1954  H. H. VANDERZEE ET AL  2,666,649
RECORD CHANGER
Filed Oct. 21, 1946  16 Sheets-Sheet 4
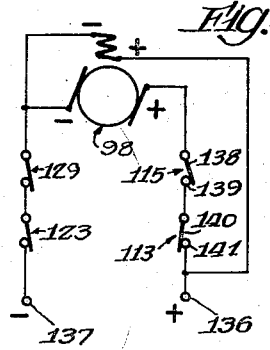
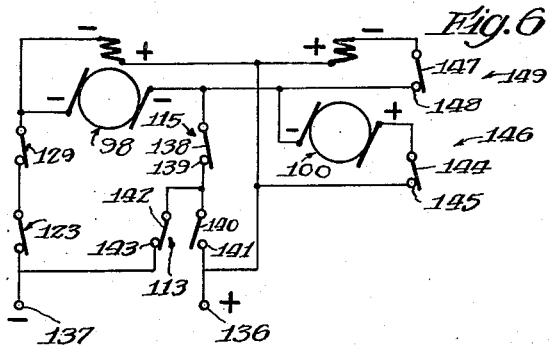
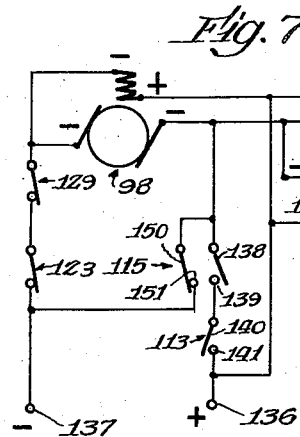
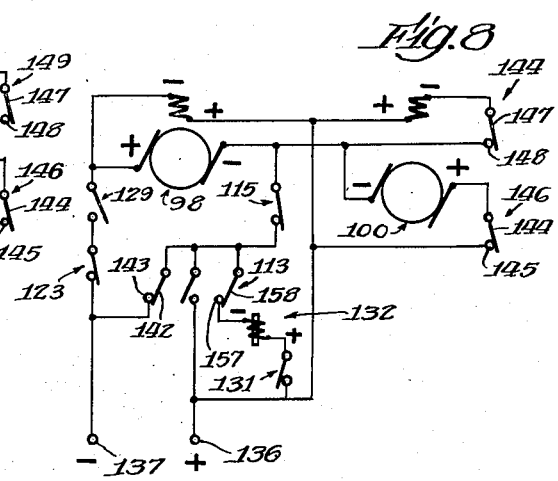
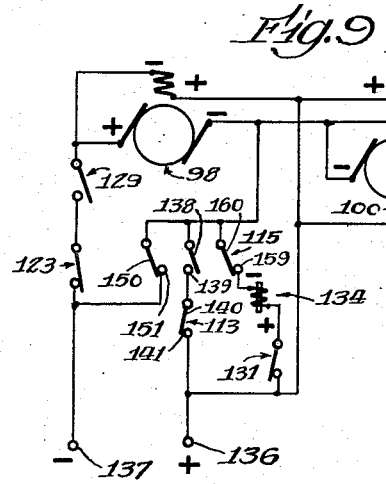
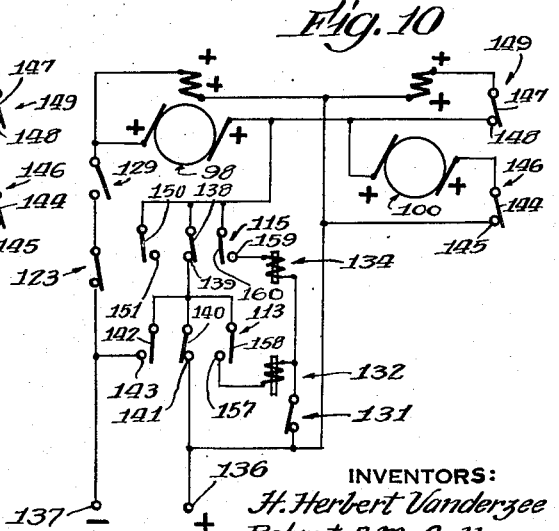
INVENTORS:
H. Herbert Vanderzee
Robert A. McCallum
BY
Clarence J. Loftus, ATTORNEY Jan. 19, 1954
H. H. VANDERZEE ET AL
2,666,649
RECORD CHANGER
Filed Oct. 21, 1946
16 Sheets-Sheet 6
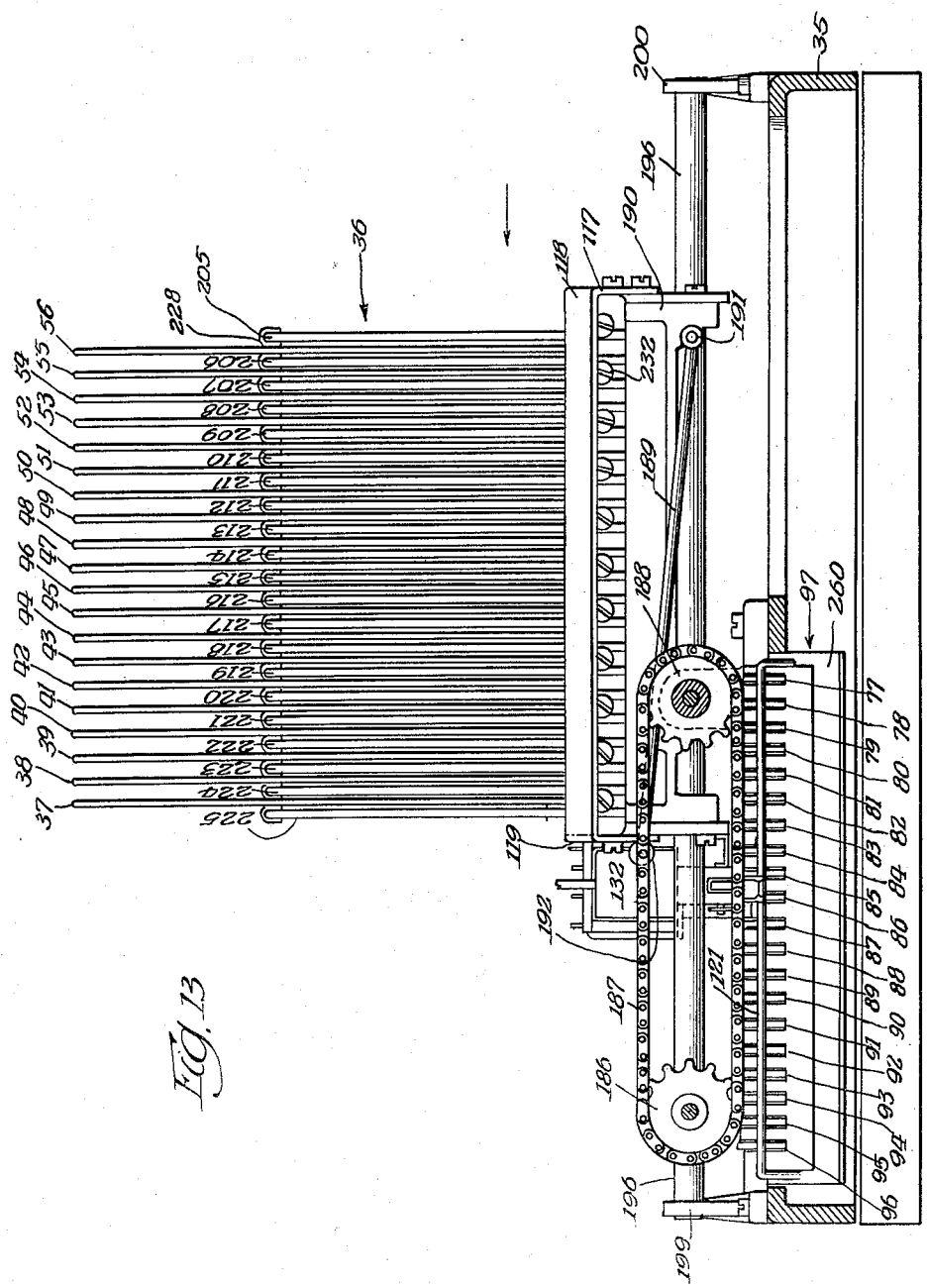
Inventors
H. Herbert Vanderzee
Robert H. McCallum
By Clarence J. Loftus Atty.

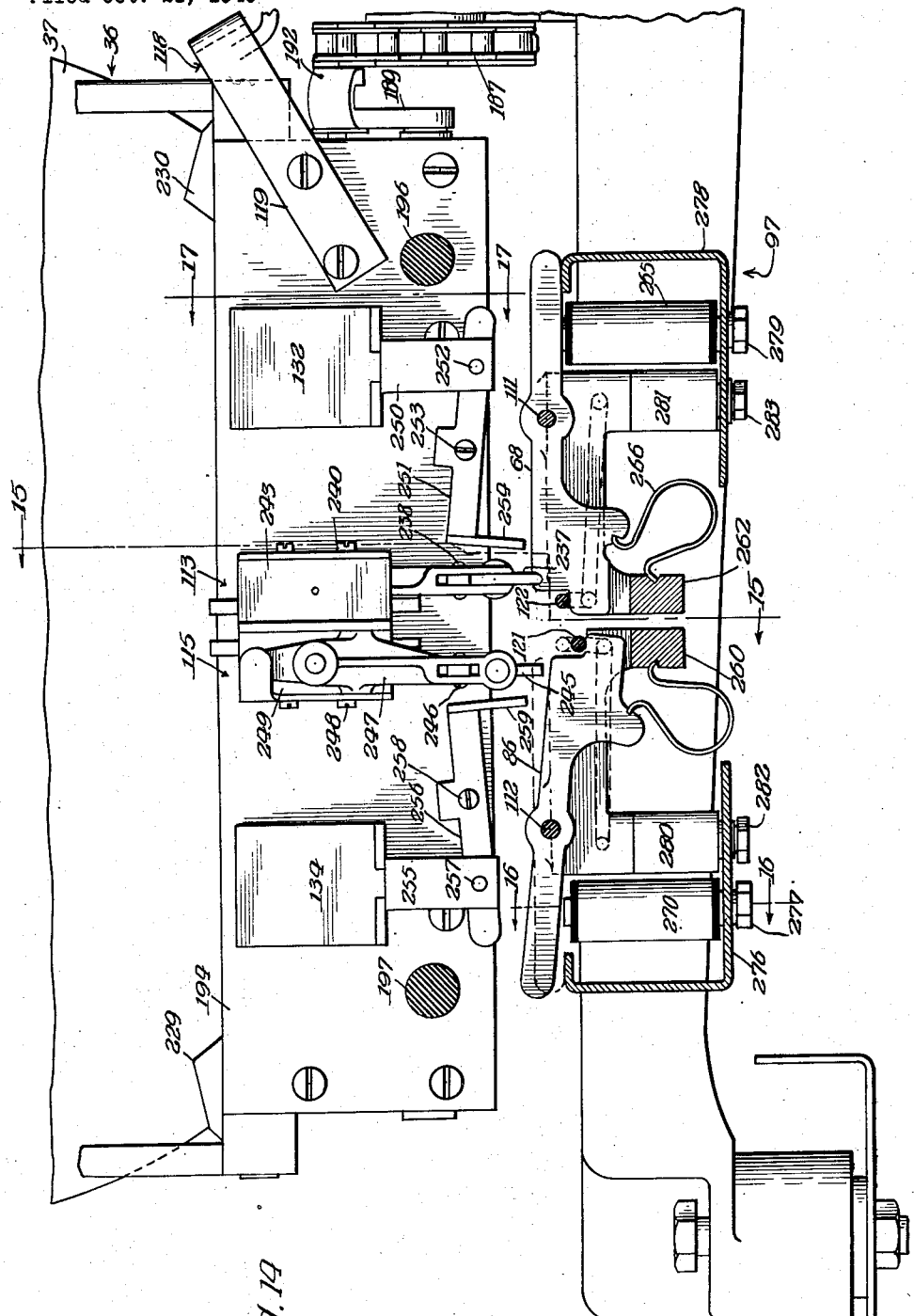

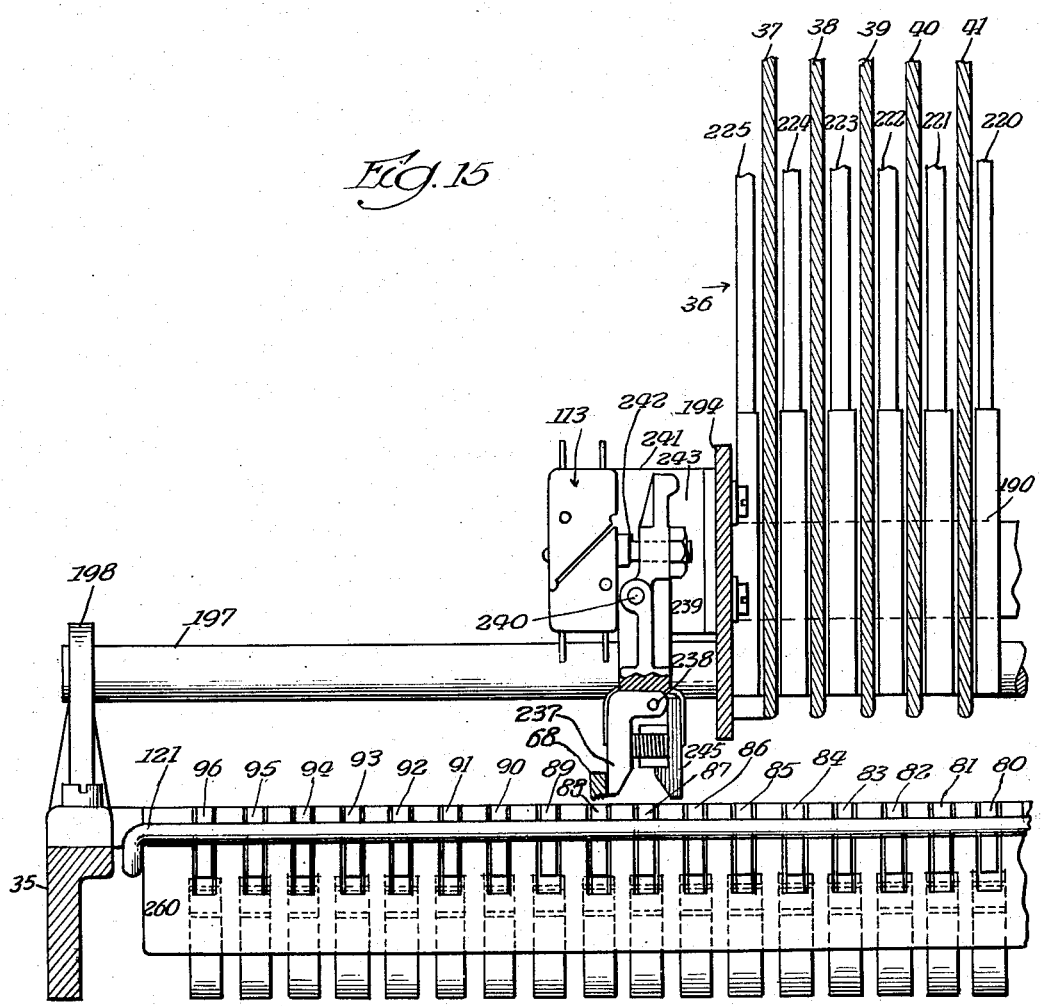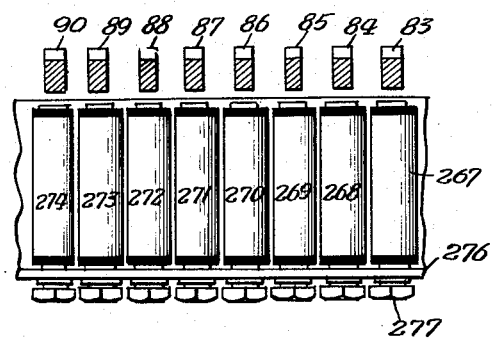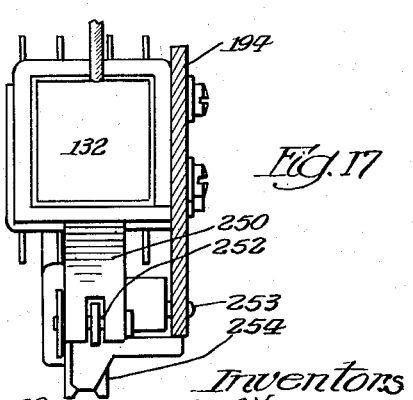

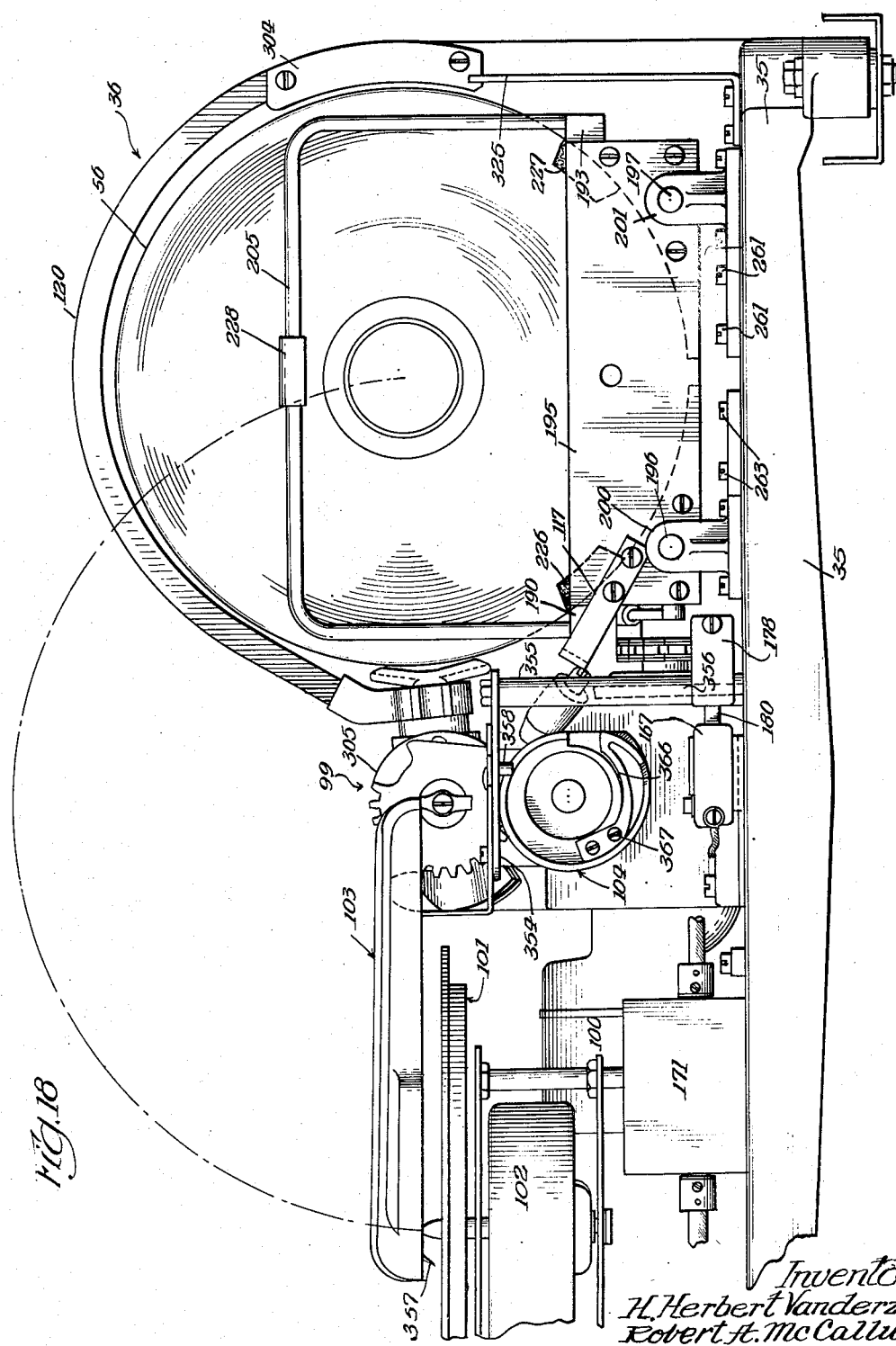

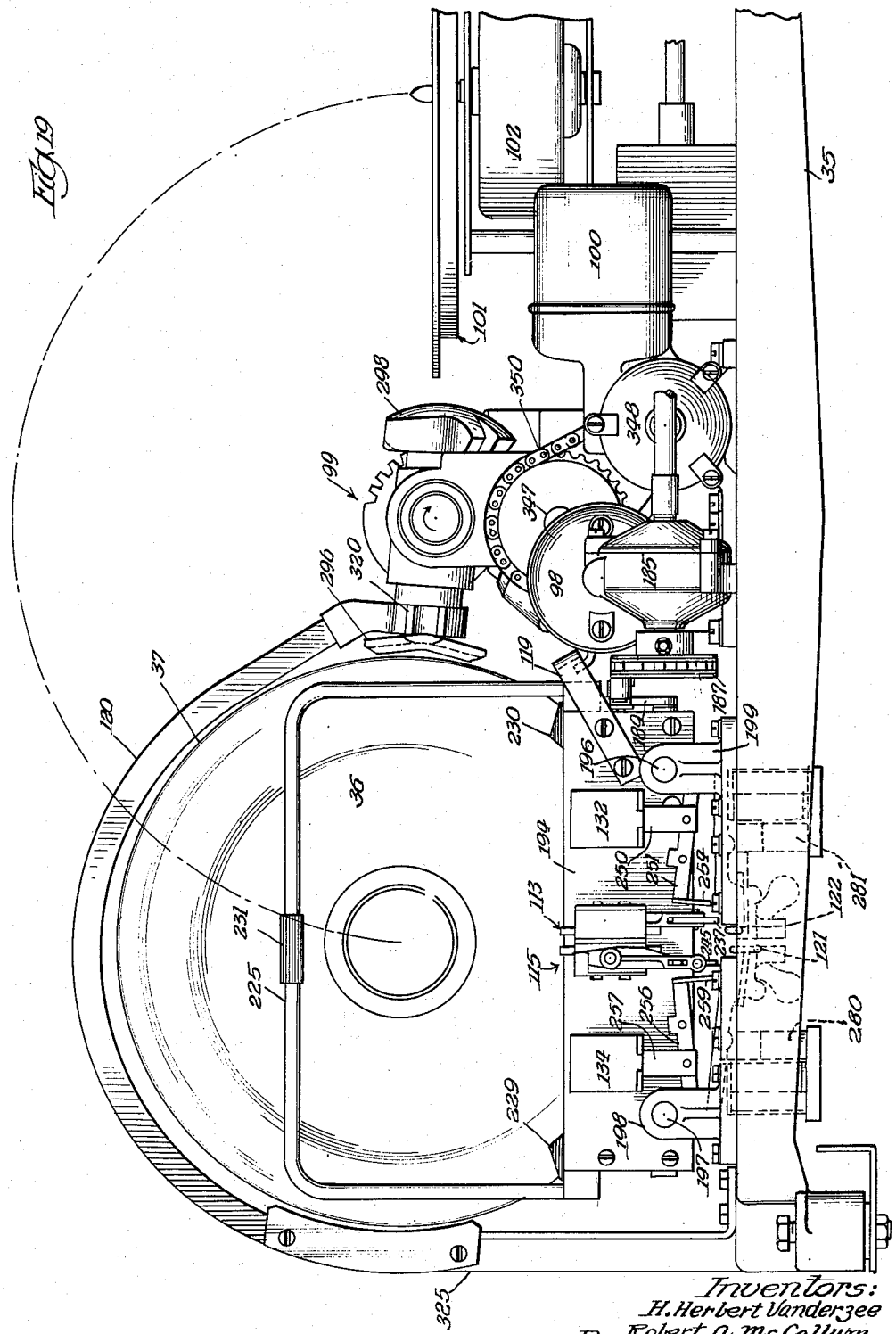

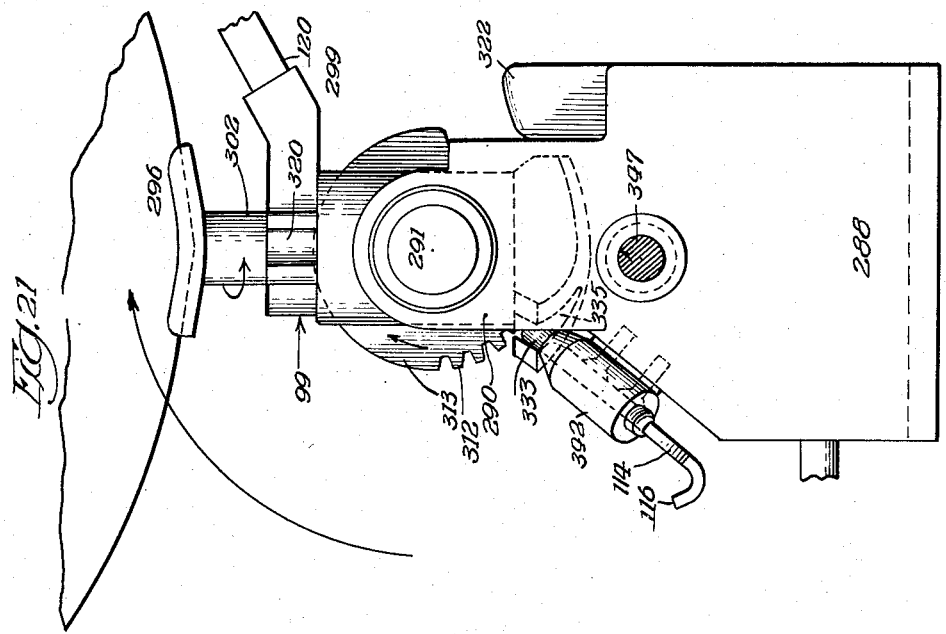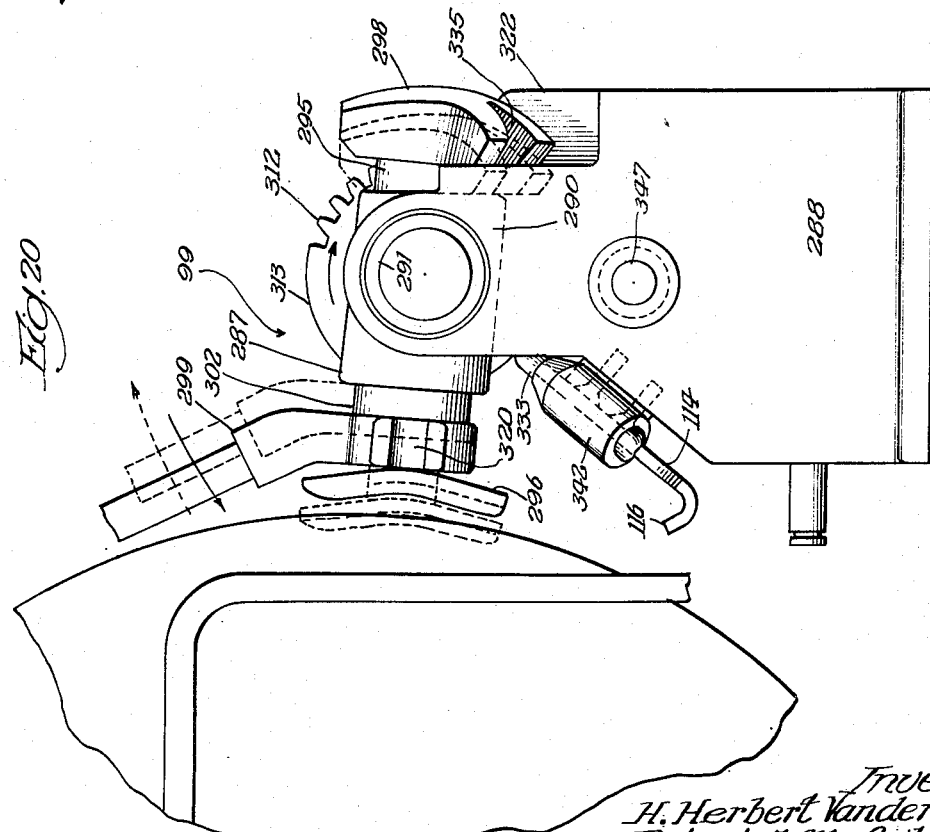

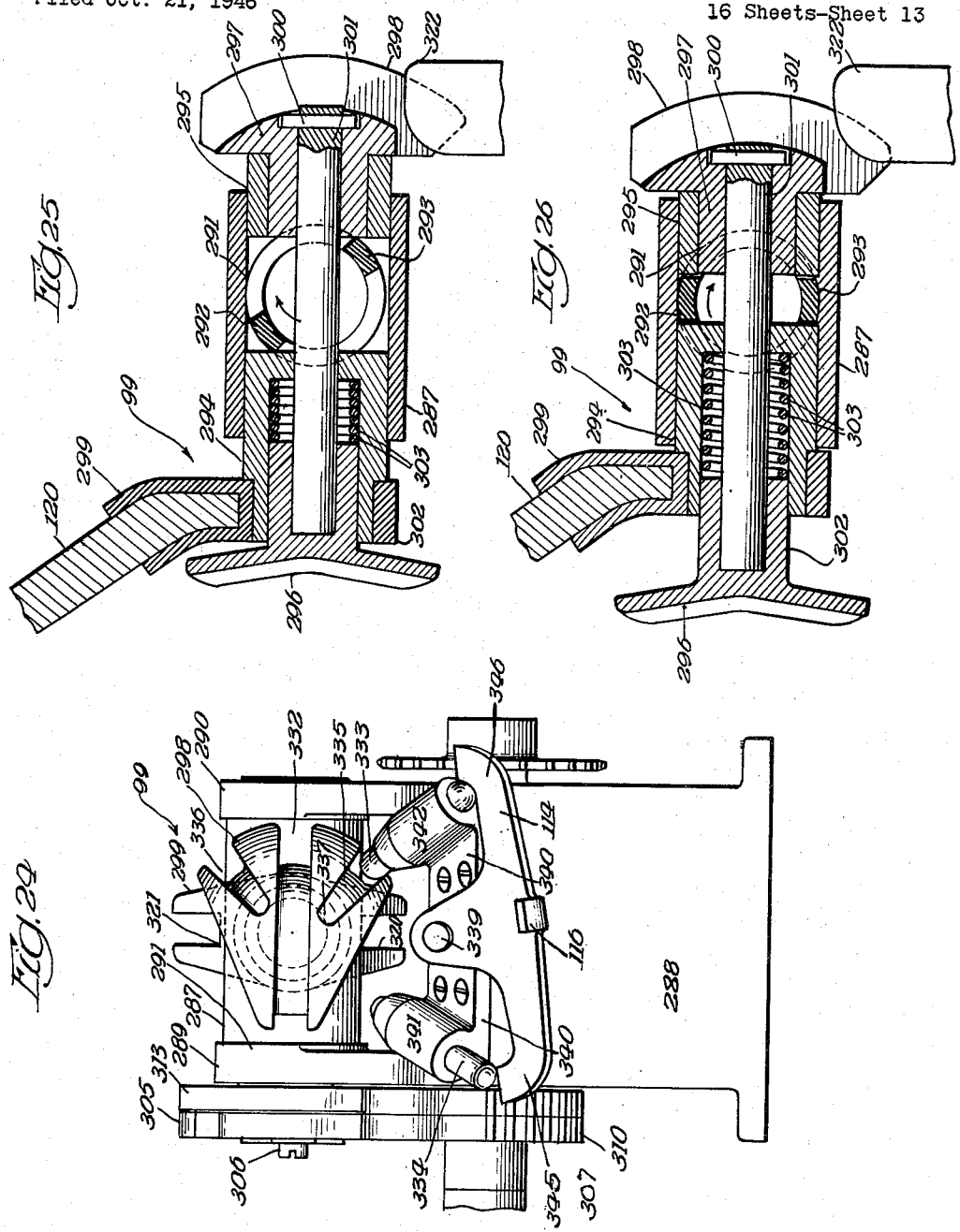

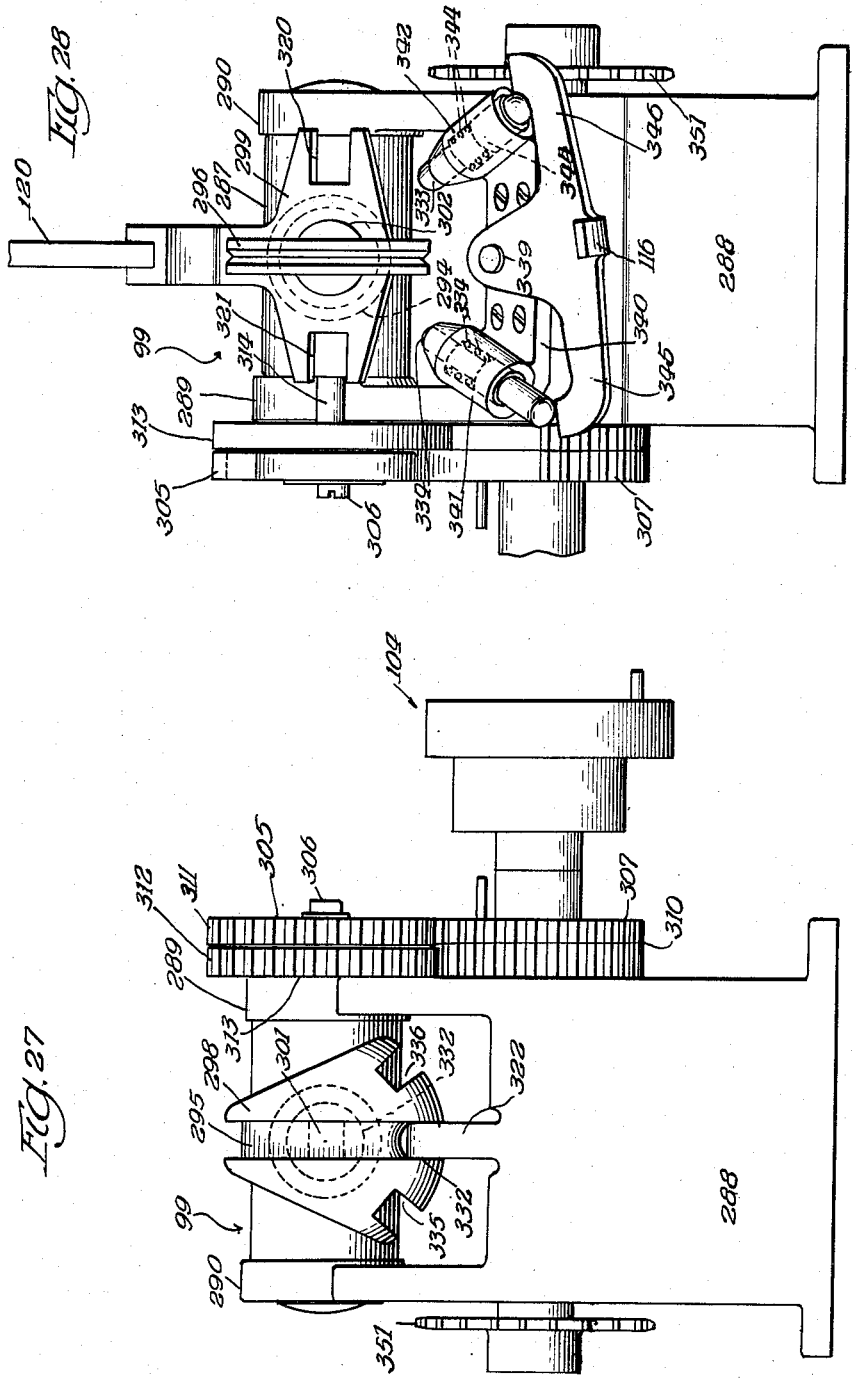

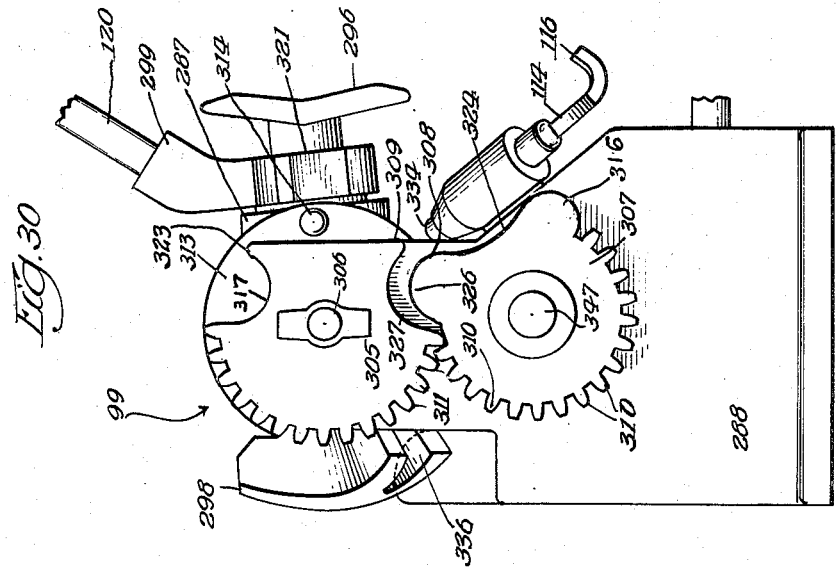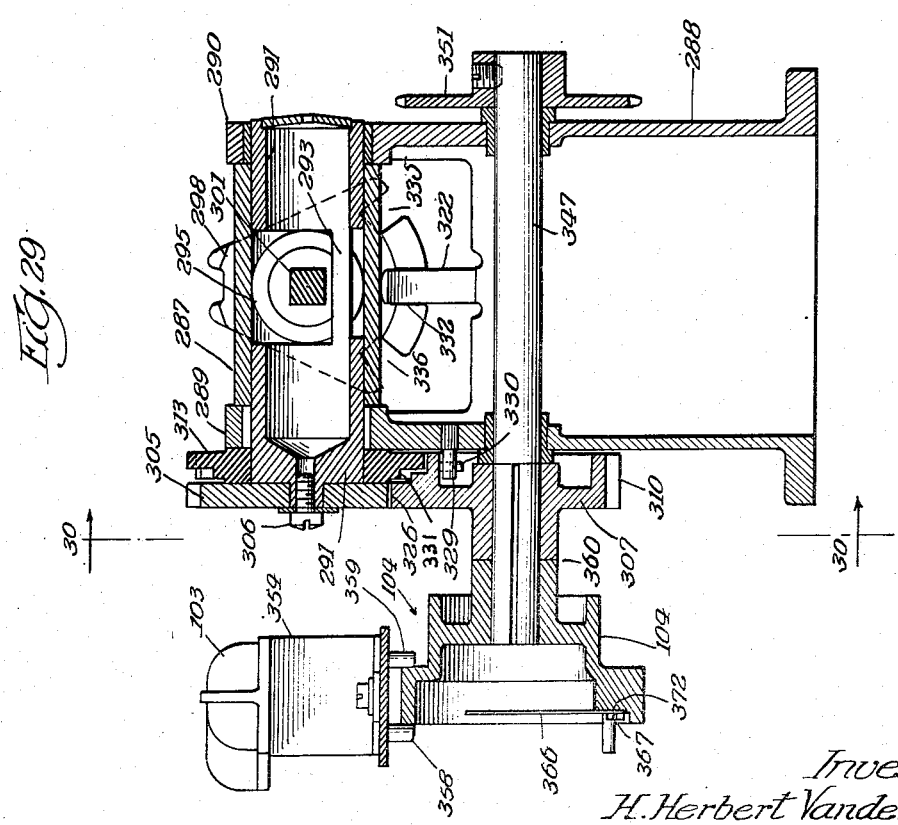

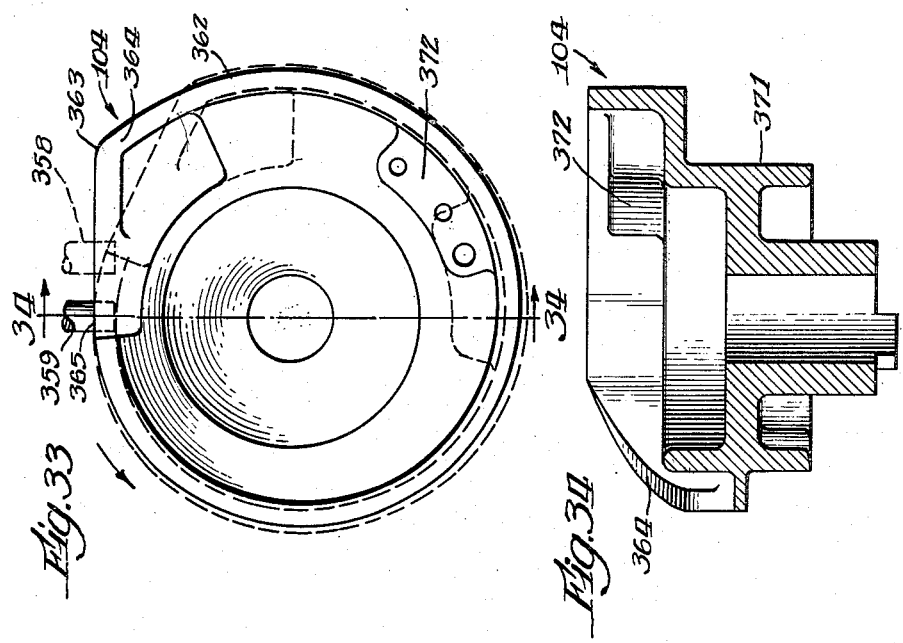
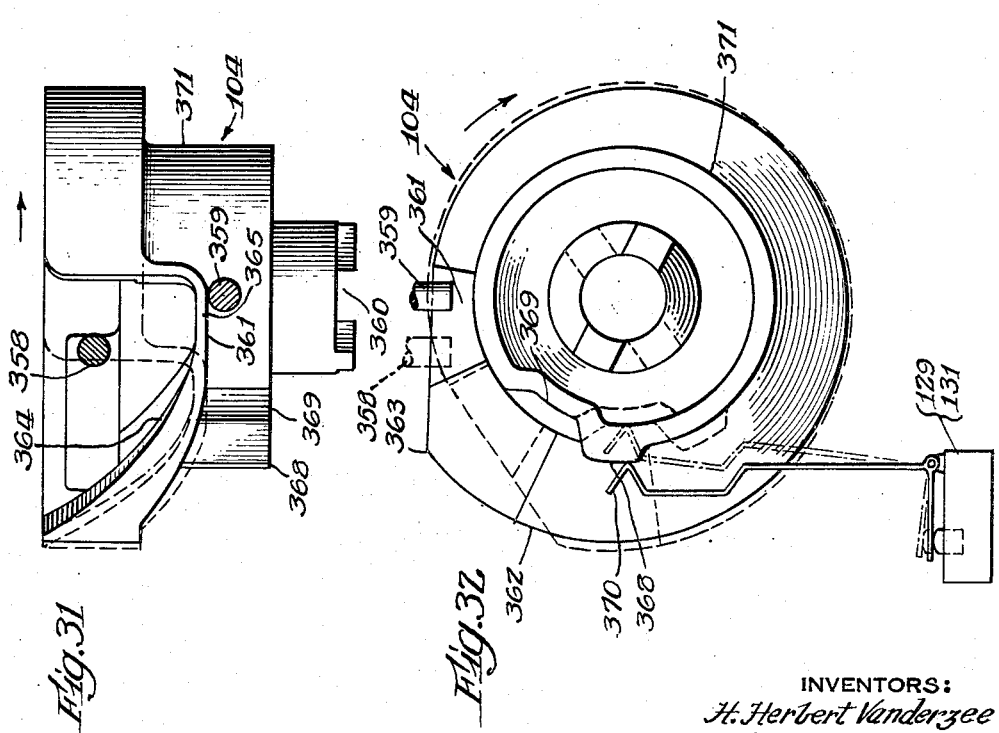

Patented Jan. 19, 1954

2,666,649

UNITED STATES PATENT OFFICE

2,666,649

RECORD CHANGER

Harry Herbert Vanderzee, Racine, Wis., and Robert A. McCallum, Clarendon Hills, Ill., assignors, by mesne assignments, to A M I Incorporated, a corporation of Delaware Application October 21, 1946, Serial No. 704,588

6 Claims. (Cl. 274—10)

The present invention relates to record changers for phonographs and more specifically to an automatic phonograph record changer of the general character disclosed in United States Patent No. Re. 21,514, reissued July 23, 1940, to the Automatic Instrument Company, assignee of Clifford H. Green, deceased.

An automatic phonograph of the type under consideration is adapted to afford a large number of selections and to play either side of each record. The broad functions of the record changer are to select a given record disc or take it from a magazine, to lay one side or the other on a playing turntable, to furnish the desired program, then to take the record from the turntable and to return it to the rack, then to repeat the cycle of operations until the desired program is completed. These functions are performed by the following units:

1. A record rack or magazine in which there are stored a plurality of record discs constituting the available selections;

2. A selector device and associated equipment which responds to the deposit of each coin unit of a customer and/or to a manual selecting operation in such manner as to cause the record magazine to move and to place the selected record in a position where it can be grasped and placed on the phonograph turntable, this position hereinafter referred to as the "transfer position";

3. A transfer mechanism for gripping the selected record upon its attainment of the transfer position and placing it on the phonograph turntable, this mechanism also being operable to return the record to the magazine upon the completion of its play. These two phases of operation being hereinafter referred to as the "delivery phase" and the "return phase";

4. Motor means for driving the record magazine and the transfer mechanism;

5. Means for moving the record magazine when a selection is made and for stopping the magazine when the selected record disc reaches the transfer position;

6. Means for causing the transfer mechanism to be driven in one direction during the record delivery phase;

7. Means for causing the transfer mechanism to be driven in the reverse direction during the record return phase;

8. A phonograph proper, consisting of a tone arm and a turntable, for playing the record so selected, transferred and delivered; and 9. A turntable driving motor.

The objects

The broad object of the present invention is to provide an improved, simplified record changer structure, particularly in the cooperating parts of the selector and record magazine. Ancillary objectives under this heading are to reduce the number of parts, to cut down manufacturing costs, to eliminate adjustments, and to provide a record changer of maximum reliability and durability. Another object of the invention contemplates the provision of means for preventing the furnishing of a greater number of selections than the number paid for and for frustrating attempts to defraud.

It is a further object of the invention to provide means for stabilizing the tone arm as it is finally placed into the playing position and to eliminate the undesirable interval before the attainment of the playing position during which freedom of movement between follower and cam exists.

Another object of the invention is to provide a simple expedient for controlling the displacements and movements of the record magazine, independently of the control normally exerted over it by the selector in actual operation, for the purpose of facilitating adjustments and stocking of records in the record magazine.

It is also an object of the invention to provide an improved and simplified magazine rack assembly, and to reduce the undesired effects of record disc warpage.

Still another object of the invention is to provide a simple electric arrangement for canceling a selection and returning a record to the rack at the convenience of the operator.

An additional object of the invention is to provide a simplified transfer mechanism for assuring a firm grasp by the transfer mechanism on each record disc before it is transported, as well as an improved and smooth-acting system having long wearing qualities for causing one side or the other of the record to be laid on the turntable.

Other objects and advantages of the invention will become apparent in the following description, taken with reference to the accompanying drawings, in which an illustrative embodiment of the invention is shown.

The drawings

Figure 1:
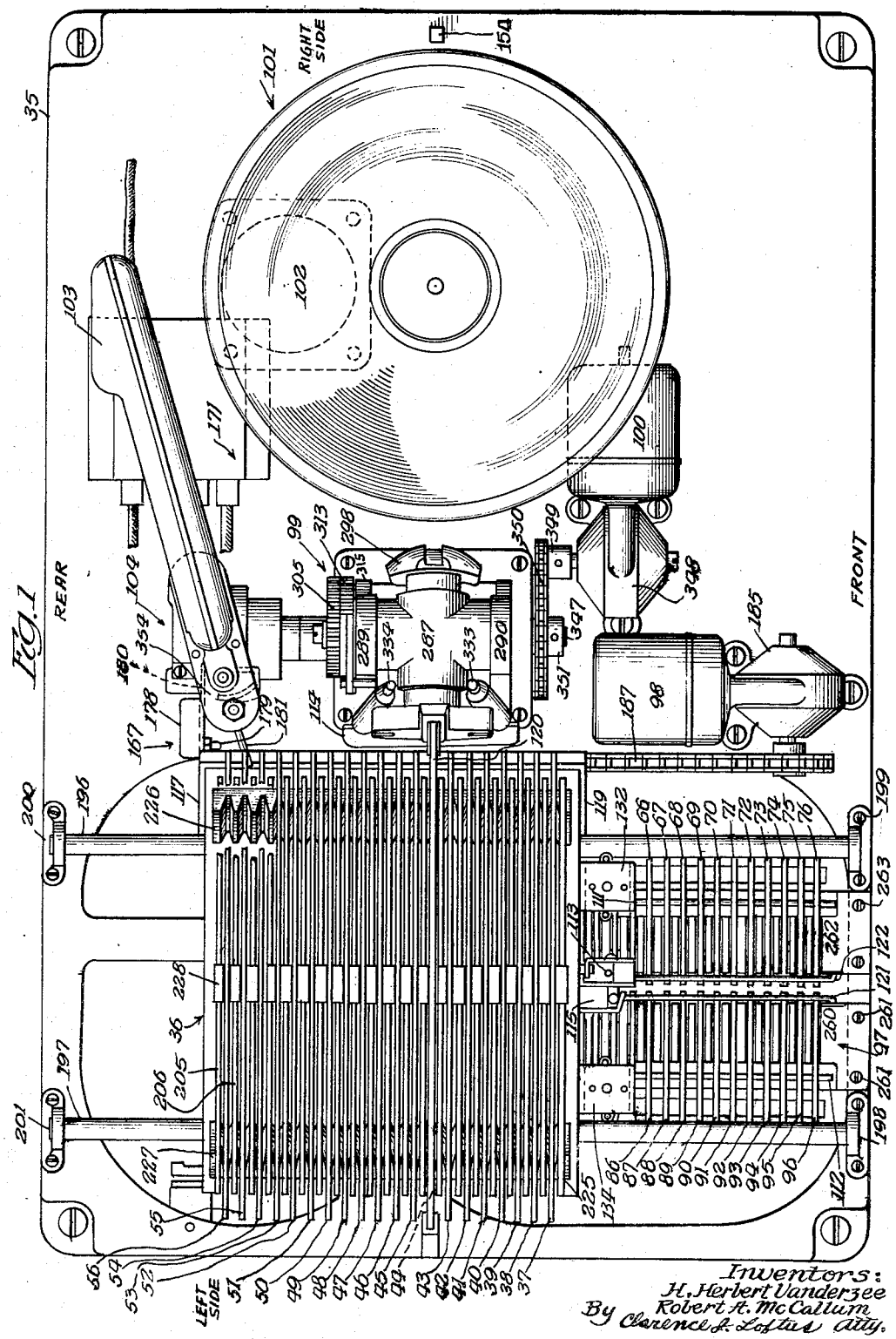
Fig. 1 is a top plan view of an automatic record changer in accordance with a preferred embodiment of the present invention.
Figure 4:
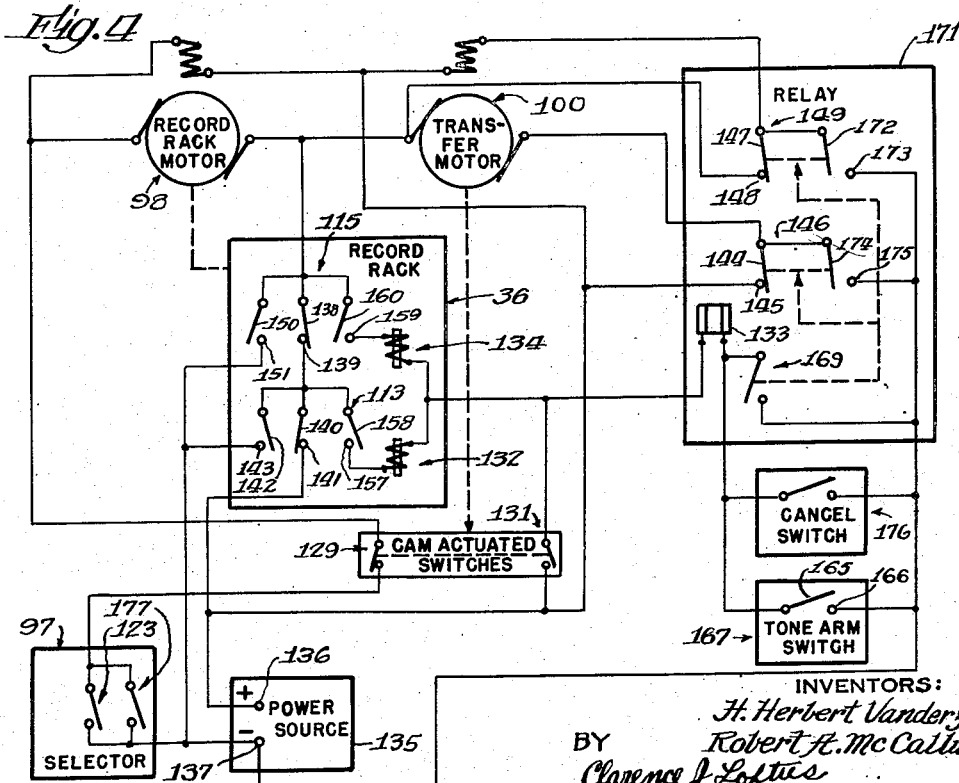
Fig. 4 is a complete electrical circuit diagram of the record rack motor, the transfer motor, and the various switches and other electrical devices employed to control their operation.
Figure 22:
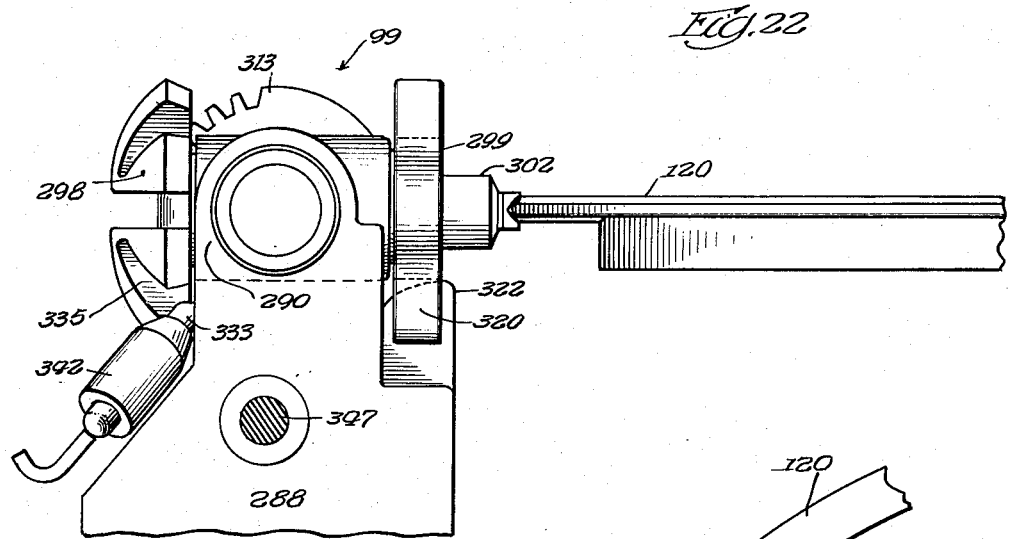
Figure 23:
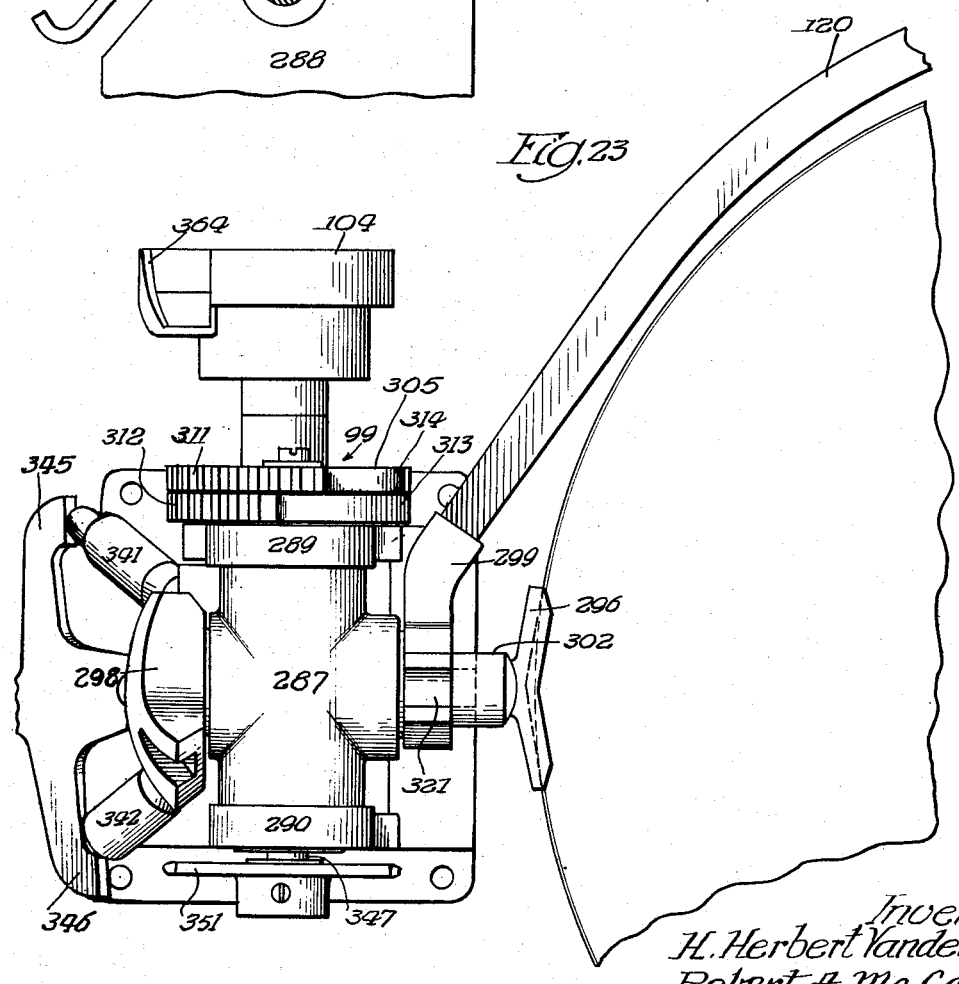

Figs. 5, 6, 7, 8, 9, 10, 11, and 12 are circuit diagrams illustrating the specific circuit conditions of the overall circuit illustrated in Fig. 4 during various phases of record changer operation hereinbelow specifically described;

Fig. 13 is a right side elevational view of the record magazine and selector, as seen by an observer stationed at the location of the transfer mechanism;

Fig. 14 is a front elevational view, partly in section, of the selector and record magazine, showing the details of the electrical switches and solenoids carried by the magazine and the mode of their interaction with the selector levers, as seen by an observer stationed in front of the record changer;

Fig. 15 is a fragmentary right side elevational view of the record magazine and selector as taken on line 15—15 of Fig. 14 and looking in the direction of the arrows;

Fig. 16 is a fragmentary right side elevational view, taken on line 16—16 of Fig. 14, looking in the direction of the arrows, showing the details of some of the electromagnets included in the selector and their relative positions with respect to the selector levers;

Fig. 17 is a fragmentary right side elevational view of one of the solenoids carried by the magazine rack, as seen by an observer looking in the direction of the arrows on line 17—17 of Fig. 14;

Fig. 18 is a rear elevational view of the automatic record changer showing clearly the conditions which exist when the changer is not in operation or up to the time when a selected record attains the transfer position;

Fig. 19 is a front elevational view of the automatic record changer under the same conditions as in Fig. 18;

Fig. 20 is a front elevational view of the transfer mechanism showing the positions of its parts both before (full lines) and after (dashed lines) the operation of record-gripping which precedes transfer;

Fig. 21 is a front elevational view of the transfer mechanism showing the positions of its parts when the selected record disc has been moved approximately half way from the record magazine to the turntable and before a counterclockwise twist has been imparted to the grippers for the purpose of placing the rear side of the record disc in playing position;

Fig. 22 is a front elevational view of the transfer mechanism, showing the positions of its parts at the instant of placement of a selected record disc on the turntable (the rear side of the record having been selected);

Fig. 23 is a top plan view of the transfer mechanism under the conditions illustrated in Fig. 22;

Fig. 24 is a left end view of the transfer mechanism, under the same conditions shown in Figs. 22 and 23, the record disc being down on the turntable;

Fig. 25 is a front elevational sectional view of the transfer mechanism showing the positions of its parts immediately before a selected record is gripped, the record being in the transfer position (see also Figs. 18 and 19);

Fig. 26 is a front elevational sectional view of the record transfer mechanism showing the conditions which exist therein when the record has been gripped (see also the dashed lines in Fig. 20);

Fig. 27 is a right side elevational view of the transfer mechanism showing the positions of its parts when the record is in a transfer position and the grippers are ready to grasp it (see also Figs. 18 and 19 and the full lines in Fig. 20);

Fig. 28 is a left side elevational view of the transfer mechanism showing the like conditions as they would appear to an observer stationed at the record rack (see also Figs. 18, 19, 27, and the full lines in Fig. 20);

Fig. 29 is a left side elevational sectional view of the transfer mechanism as seen by an observer stationed at the record rack (under the same conditions pictured by Figs. 18, 19, 27, 28 and the full lines of Fig. 20);

Fig. 30 is a rear elevational view of the transfer mechanism, showing the positions of its parts at the instant of initiation of the gripping operation (see also Fig. 20); and Figs. 31 to 34, inclusive, are, respectively, top plan, front elevational, rear elevational, and right side elevational sectional views of the tone arm cam included in the Fig. 1 embodiment, Fig. 32 also showing the relationship between the tone arm cam and the cam switches, each of Figs. 32 and 33 making a full-line showing of the position of the cam during record play and a dashed line showing of the position of the cam prior to transfer of a selected record from the record magazine to the turntable.

The general plan

Referring now specifically to Fig. 1, there are shown the following principal automatic record changer components: (a) a suitable metallic base 35; (b) a record rack or magazine 36, in which there are mounted uniformly spaced record discs 37 to 56, inclusive; (c) a selector 97, for determining the record discs to be played, comprising two banks of selector levers, one bank consisting of the levers numbered 57 to 76, inclusive, and the other bank consisting of the levers numbered 77 to 96, inclusive, individual ones of the right-hand selector levers numbered 57 through 76 corresponding to individual front sides of the record discs numbered 37 through 56, respectively, and individual ones of the selector levers numbered 77 through 96 corresponding to individual rear sides of the record discs numbered 37 through 56, inclusive; (d) a record rack or magazine motor 98 for driving the record rack in such fashion as to place any selected record in the transfer position (record 44 being in that position in Fig. 1); (e) a transfer mechanism, indicated generally by the numeral 99 for picking up any selected record from the magazine and placing it on the phonograph turntable before playing of the record and for returning it to the record magazine upon completion of the playing of the record; (f) a transfer or cam shaft motor 100 for driving the transfer mechanism; (g) a playing turntable 101; (h) a motor 102 for driving the turntable; (i) a phonograph tone arm 103; (j) a tone arm cam 104, controlled by the transfer mechanism, for placing the tone arm on a record disc to be played and for removing the tone arm from the record disc when it has been played.

The detailed construction and operation of this preferred form of our invention are hereinbelow described, but the above general outline and the teachings of the aforementioned Green patent are sufficient to establish the general background for the following detailed description of my invention wherein attention is focused on those features in which it departs from the prior art.

*The selector-magazine interaction*

Figure 2:
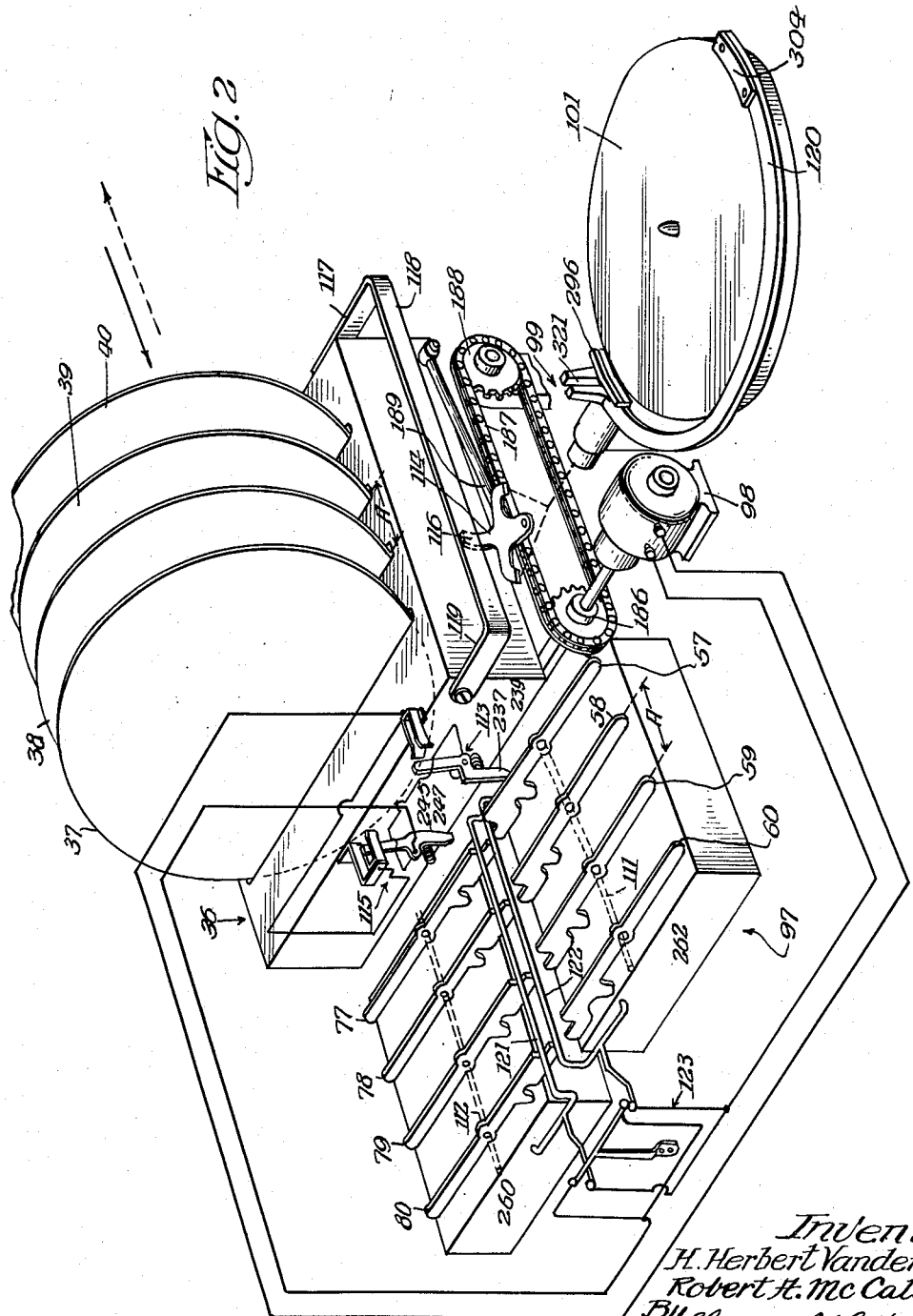
Fig. 2 is a schematic view, not intended to be accurately pictorial, of parts of the selector and the reciprocating record magazine included in the Fig. 1 embodiment, showing the basic interaction between the record magazine and the selector.

Fig. 2 is not intended to be a faithful reproduction of the automatic record changer provided in accordance with the invention, but it is a skeletonized and schematic view to be employed as an aid in describing one of the important features of the invention. Although the magazine has compartments for twenty record discs, representing the forty selections available, and although the selector includes two banks of twenty selector levers each, Fig. 2 includes representations only of record discs 37—40, right hand selector levers 57—60 and left hand selectors 77—80, since this partial showing of the essentials of the magazine and selector is sufficient to illustrate the feature hereinabove referred to.

This feature exploits interaction of the magazine and the selector for the purpose of placing any selected record in one predetermined transfer position at which it can be handled by the transfer mechanism 99. The record changer accordingly comprises a selector 97 having a plurality of uniformly spaced parallel tripping members 57—76 arranged in a right hand bank, and a like plurality of uniformly spaced tripping members 77—96 arranged in a left hand bank. The magazine 36 comprises a number of spacing elements which maintain the record discs 37—56, in vertical positions and in spaced parallelism. It is important that the spacing between the central planes of each two successive records (for example, records 38 and 39) be equal to the spacing between the central axes of the corresponding selector levers (for example, 58—59 or 78—79) as indicated on the drawing by the dimension "A." It will be noted that the record discs are mounted in an inverse order with respect to the sequence of the corresponding tripping members. Either one of a pair of two aligned opposed selector elements (for example element 57 or 77) is adapted when actuated to select an individual one of the discs (for example, record disc 37).

The selector levers in the right hand bank are individually pivotally mounted on a shaft 111. Similarly, the levers in the left hand bank are mounted on a shaft 112. Each of the selector levers is normally neutral but turnable when actuated to make a selection, those levers in the right hand bank being turnable clockwise (as viewed from the front) and those in the left hand bank being turnable counterclockwise as viewed from the front. For example, when the front side of record disc 37 is selected, selector 57 is actuated or turned to the position illustrated in Fig. 2. It will be seen that all of the other selector levers are still in their neutral positions. When, on the other hand, the rear side of the record disc 37 is selected, the selector lever 77 is displaced from neutral. For purposes of further illustating the above-mentioned feature, it will be assumed that lever 57 has been actuated to make one selection. Of course, any number of selections may be made, and the record changer will operate until all have been played.

Means including the record rack motor 98 is provided for reciprocally sweeping magazine 36 across selector 97 with linear motion of translation. When any one of the selector levers is actuated, it lifts a bail switch bar 121 or 122, closing a bail switch 123 included in an energizing circuit of the record rack motor 98. This bail switch is closed as long as any selections remain to be played, the operation of my record changer being such that the operating cycle will be repeated until all of the selections have been played. Upon the completion of the ordered program, switch bars 121 and 122 are restored to normal and the record rack motor stops. It is the lifting of either one or both bars 121 and 122 in the making of one or more selections which causes motor 98 to start. The rack moving means is hereinbelow specifically described in the section devoted to the details of the record rack. Under the conditions illustrated in Fig. 2, the record rack moves toward the front until a projecting member included in and depending from electrical switch 113, secured to the front of magazine 36, strikes stopping or tripping element 57. The abutment of this projecting member against lever 57 opens the switch and the energizing circuit of the record rack motor 98 and the record rack stops, placing record 37 in the transfer position. Had the normally deactivated selecting means 58 been tripped, instead of element 57, the projecting member would have passed clear of lever 57 and would have interacted with 58, so that record disc 38 would have been placed in the transfer position. Similarly, actuation of stopping element 59 causes record disc 39 to stop in the transfer position and actuation of abutment element 60 causes record 40 to stop in the transfer position. It will be noted then that each one of the levers 57—60 controls the stopping of one of the corresponding records 37—40 in the same predetermined transfer position. Switch 113 constitutes means controlled by interaction of the selector 97 and the magazine 36 for deenergizing the record rack motor and stopping the magazine, because the circuit breaking means 113 is responsive to abutment against any one of the stopping elements, when that one of the stopping elements has been actuated, to stop motor 98 and arrest the sweeping motion of translation of the magazine 36. The magazine is always stopped in a position dependent upon the position of the tripping or selecting means which has been actuated. In response to the making of various selections, the record rack stops in different positions but always in such fashion as to place the selected disc in the transfer position.

It will be noted that when the record magazine is moving in the direction indicated by the full line arrow in Fig. 2, the rocker plate 114 is cocked in a clockwise position. Let it now be assumed that the record magazine starts from the position illustrated, that lever 57 is in neutral and that lever 77 has been activated. The record rack then moves in the direction indicated by the full line arrow until the projecting member of switch 115 has passed over all of the levers in the left hand bank. Then the tail 116 of the rocker plate strikes rear end 117 of cross bar 118 and trips rocker plate 114 to a counterclockwise position (as viewed from the top). At the same time, the direction of travel of the magazine reverses. The magazine then moves linearly toward the rear until the projecting member of switch 115 strikes lever 77. Switch 115 is responsive to such a strike to open the energizing circuit of motor 98 and stop the magazine. Therefore actuation of either lever 57 or lever 77 causes record disc 37 to be placed in the transfer position. When the record is so placed as the result of actuation of lever 77, rocker plate 114 is in the counterclockwise position, having been placed there by its tail abutment against end 117 of cross bar 118. But when the record is so placed by actuation of lever 57, plate 114 is in the clockwise position, having been placed there by its tail abutment against end 119 of cross bar 118. As will be made clear in the description hereinbelow in the section entitled "Transfer mechanism" the position of rocker plate 114 determines which side of the given record will be placed on the turntable in playing position. Thus, when any one of the selector levers 57—76 is actuated, the corresponding record disc 37—56 is placed in the transfer position and rocker plate 114 is in the clockwise position (as viewed from the top), causing the front side of the record to be played. Additionally, when any one of the selector levers 77—96 is actuated and the corresponding one of the record discs 37—56 is placed in the transfer position, rocker plate 114 is in the counterclockwise position, causing the rear side of the record to be placed in playing position.

The depending or projecting member of switch 113 is so shaped that it engages one side of any actuated one of the levers 57—76 when the magazine is traveling toward the front, but does not engage any of the levers either when the magazine is moving toward the rear or when they have not been actuated. Similarly, the projecting member of switch 115 is so shaped that it will not strike any of the levers 77—96, inclusive, either when the lever has not been actuated or when the magazine is moving toward the front. It strikes any one of levers 77—96 when the magazine is moving toward the rear and when that one has been actuated.

When the record changer operates in response to actuation of one of the tripping members in the right hand bank, the arcuate record gripper 120 is ultimately placed in the position shown in Fig. 2. When any one of the selector levers in the left hand bank is actuated, gripper 120 ultimately assumes the position shown in Fig. 23, as fully explained hereinbelow.

Thus it will be seen that in accordance with this important feature of the invention, there is provided a mechanism for placing any selected one of a number of spaced record discs 37—56 in either of two playing positions. That mechanism comprises a conveyor 36 for carrying any selected one of said discs to a transfer position, a selector 97 including two opposed banks of selector elements, 57—76 and 77—96, each consisting of a plurality of normally neutral selector elements corresponding in number, inverse order and spacing to said discs, either one of a pair (for example, 57, 77) of two aligned opposed selector elements being adapted when actuated to select an individual one of said discs (for example, 37), motor means 98 for reciprocally sweeping said conveyor across said selector, and two circuit breaker means 113, 115, mounted on said conveyor and adapted to be tripped to stop said motor 98 and arrest said sweeping motion. One of said circuit breaking means 113 is mounted over one of said banks (right hand) and so shaped as to be tripped upon impact with one element of said pair (for example, 57) during movement of said conveyor in one direction (toward the front), the other of said circuit breaking means 115 being mounted over the other of said banks (left hand) and so shaped as to be tripped upon impact with the other element (for example, 77) of said pair during movement of said conveyor in the opposite direction (toward the back), either of said circuit berakers operating when tripped to stop said one (for example, 37) of said discs in said transfer position, a transfer mechanism 99 having two settings for placing one side (front) or the other (rear) of said record in playing position, and interengaging means (118, 116) on said conveyor 36 and said transfer mechanism 99 for changing the setting of said mechanism upon each reversal of conveyor motion, whereby actuation of one for example, 57) of said two aligned opposed selector elements causes one side (front) of its corresponding record (for example, 37) to be placed in playing position or actuation of the other (for example, 77) of said two aligned opposed selector elements causes the other side (rear) of said record to be placed in playing position. In addition, we utilize the switching arrangements 113, 115 to brake the record rack motor when any selected record has attained the transfer position and to start the transfer motor, as specifically pointed out hereinbelow. The Fig. 2 circuit arrangements are approximate electrical equivalents drawn for the purpose of developing general principles and the precise circuit arrangements actually used are hereinbelow specifically described.

In the Fig. 2 showing, electrical insulation problems are disregarded and proper insulation is assumed, for the reason that anyone having any knowledge of this art would know how to provide insulation, where required.

Figure 3:
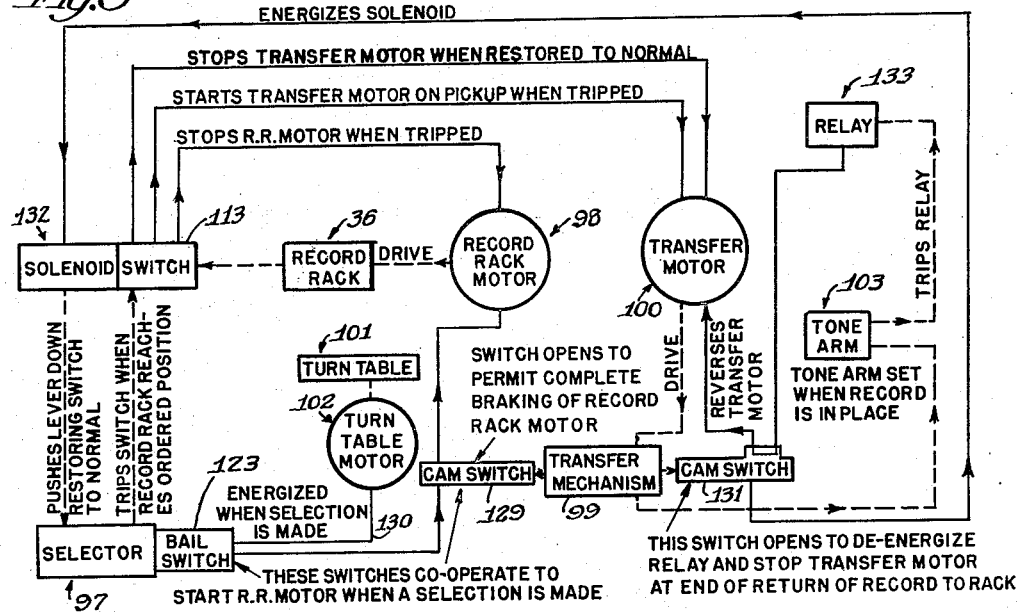
Fig. 3 is a block diagram employed as an aid in describing the general or gross operation of the record changer illustrated in Fig. 1.

Having described what at present appears to be one important feature of our invention, we now make reference to the block diagram of Fig. 3 as an aid in explaining the overall operation of the record changer as a whole. This explanation precedes the detailed description of other important inventive features of our record changer.

The overall operation

The gross cycle of operation as represented in Fig. 3 is as follows: (a) A selection is made by actuating one of the levers in selector 97; (b) An energizing circuit to the record rack motor 98 is closed through bail switch 123 and a cam switch 129; (c) The record rack motor starts and the magazine moves the selected record disc to the transfer position; (d) At the time that the bail switch is closed, the turntable motor 102 is turned on by a suitable switch and ganging arrangement indicated by the full line 130 in Fig. 3 and turntable 101 is placed into operation; (e) The record magazine moves until the selected record attains the transfer position at which time switch 113 is tripped; (f) The switch 113 causes the record rack motor to be deenergized and stopped; (g) The switch also causes the transfer motor 100 to start, driving the transfer mechanism 99 in the record delivery direction; (h) The grippers on the transfer mechanism grasp the selected record and place it on the turntable; (i) At the same time, a cam 104 on the transfer mechanism drive places the tone arm 103 in playing position; (j) Another cam switch 131 is closed by the operation of the cam so driven by the transfer mechanism and switch 129 is opened; (k) When switch 131 is closed it causes a solenoid 132, carried by magazine 36, to be energized; (l) This solenoid restores the selector lever to its neutral position, whereby switch 113 is restored to normal; (m) The restoration of switch 113 to normal causes the transfer motor 100 to stop after the grippers have released the record; (n) The record continues to play and the tone arm radially traverses it toward its center; (o) Upon the completion of play, the tone arm causes a relay 133 to be tripped and that relay causes the transfer motor to be reversed; (p) The transfer mechanism again grasps the record, returns it to the magazine rack and releases it, the tone arm cam having removed the tone arm from the record; (q) At the end of the last-mentioned operation, the switch 129 is closed and the switch 131 is opened; (r) If no other selections have been made, the record changer and turntable motor stop; (s) If other selections have been made, the cycle is repeated, the turntable continuing to run until the conclusion of an ordered program.

Fig. 3 is schematic, mechanical effects being indicated by dashed lines and electrical effects being indicated by full lines. Only one (113) of the two switches carried by the record rack is represented because that showing is sufficient to illustrate the principles of operation. It will of course be understood that in addition to switch 113 and solenoid 132 the magazine also carries switch 115 and solenoid 134.

Attention is invited to the fact that the transfer mechanism can operate to deliver a record to the turntable only when cam switch 129 is closed, and that solenoid 132 can be energized and relay 133 actuated and the transfer mechanism driven in the reverse direction to return a record to the magazine only when switch 131 or an equivalent switch is closed.

The electrical control circuits

Reference is now made specifically to Figs. 4 through 12, inclusive, in a description of the electrical circuits by reason of which this overall operation is effected. A suitable direct current power source 135, having terminals 136 and 137, is provided. The circuits have six different phases of operation and two of those phases may be broken down into two sub-phases.

Fig. 5 shows the first phase, characterized by magazine motion. When a selection is made and the normally open bail switch 123 is closed, the position of the transfer mechanism is such that the cam switch 129 is also in a closed condition. Additionally, normally closed contacts 138 and 139 of switch 115 and normally closed contacts 140 and 141 of switch 113 are also closed. An energizing circuit through the record rack motor armature is closed through elements 136, 141, 140, 139, 138, 129, 123, and 137. A circuit through the motor field is closed through elements 136, 129, 123, and 137. Therefore, the record rack motor sweeps the record rack across the selector.

The record rack motor continues to run until a selected record has been placed in the transfer position. If it be assumed that one of the right hand selector levers has been actuated, the second phase, characterized by magazine stopping and transfer mechanism starting, is illustrated by Fig. 6. Switch 113 is tripped by the above-described interaction of selector and magazine. The record rack motor field is still energized, but the normally closed contacts 140 and 141 of switch 113 are separated, so that the motor armature is deenergized and the motor stops. Additionally, normally open contacts 142 and 143 of switch 113 are closed and the motor armature is short-circuited through the circuit comprising elements 123, 129, 138, 139, 142, and 143. Therefore the record rack is dynamically braked and the record magazine is brought to an abrupt stop. Further, the circuit comprising elements 136, the normally closed contacts 144 and 145 of switch 146, the armature of the transfer motor 100, contacts 138 and 139 of switch 115, contacts 142 and 143 of switch 113, and terminal 137 is closed, so that the transfer motor armature is energized. And the circuit comprising elements 136, the transfer motor field and the normally closed contacts 147 and 148 of switch 149, contacts 138 and 139 of switch 115, contacts 142 and 143 of switch 113 and terminal 137 is also closed, so that the transfer motor field is energized. Therefore, the transfer motor starts to run and so drives the transfer mechanism that the selected record is delivered to the turntable.

If, on the other hand, one of the left hand selector levers had been actuated, the second phase would be represented by the conditions shown in Fig. 7, switch 115 being tripped rather than switch 113, the record rack motor again being stopped and braked and the transfer motor again being started, the circuits being as follows:

Record rack motor armature:
 Shorted through 129, 123, contacts 150 and 151 of switch 115. De-energized because contacts 138 and 139 of switch 115 have separated.
Record rack motor field:
 Still energized.
Transfer motor armature:
 Energized through 136, contacts 144 and 145 of switch 146, contacts 150 and 151 of switch 115, terminal 137.
Transfer motor field:
 Terminal 136, normally closed contacts 147 and 148 of switch 149, contacts 150 and 151 of switch 115, terminal 137.

The third phase of operation is illustrated by Figs. 8 and 9, Fig. 8 showing the third phase which follows the conditions illustrated in Fig. 6, and Fig. 9 showing the alternative third phase which follows the conditions illustrated in Fig. 7. Referring now to Fig. 8, it will be remembered that the record has now been placed on the turntable and that the operation of the transfer mechanism is then such as to open cam switch 129 and to close cam switch 131. The closing of switch 131 causes a solenoid 132, mounted on the record magazine, to be energized, the energizing circuit being traced from terminal 136 through cam switch 131, contacts 157 and 158, 142 and 143 of switch 113 to terminal 137. The objective sought in energizing solenoid 132 is to restore the actuated selector lever to normal. The selector lever is the only influence tending to maintain the switch 113 in the condition shown in Fig. 8 and when the selector lever is restored to neutral, the switch 113 assumes the normal condition illustrated in Fig. 4. Until such restoration is effected, the transfer motor continues to run, but restoration occurs immediately after the record is placed on the turntable. It will be observed that the opening of switch 129 assures the stationary condition of the record rack and that the closing of switch 131 as the record is placed on the turntable assures operation of the transfer motor until the record is placed on the record table and the grippers released and no longer. The third phase of operation is characterized by the beginning of record play.

If, on the other hand, a left hand selector lever had been actuated, the second phase illustrated in Fig. 7 would have been followed by a third phase illustrated in Fig. 9. In that case, solenoid 134 would have been energized through a circuit comprising terminal 136, cam switch 131, contacts 159, 160, 150, and 151 of switch 115 and terminal 137. Solenoid 134 restores to neutral a left hand selector lever. It will be noted that the record rack motor field and armature are in series during the third phase. But that motor is under load and the phase is extremely brief, so that the motor does not start up and introduce undesired magazine motion.

The fourth phase of operation is the same whether a left or a right hand selector lever has been actuated. The end of the third phase is effective to set up conditions for stopping the transfer motor because it involves the restoration of switches 113 or 115, as the case may be, to the normal position illustrated in Fig. 10. The record rack motor armature and field are both open since switch 129 is open and the transfer motor armature and field are deenergized by reason of the action of solenoid 132 or 134, as the case may be, in restoring switch 113 or 115 to normal. Therefore neither transfer nor record rack motors runs and the record continues to play. Further the solenoid is deenergized and reset because, when it restores the selector lever to neutral, permitting the switch to return to normal, the solenoid cuts off its own energizing circuit.

Figure 11:
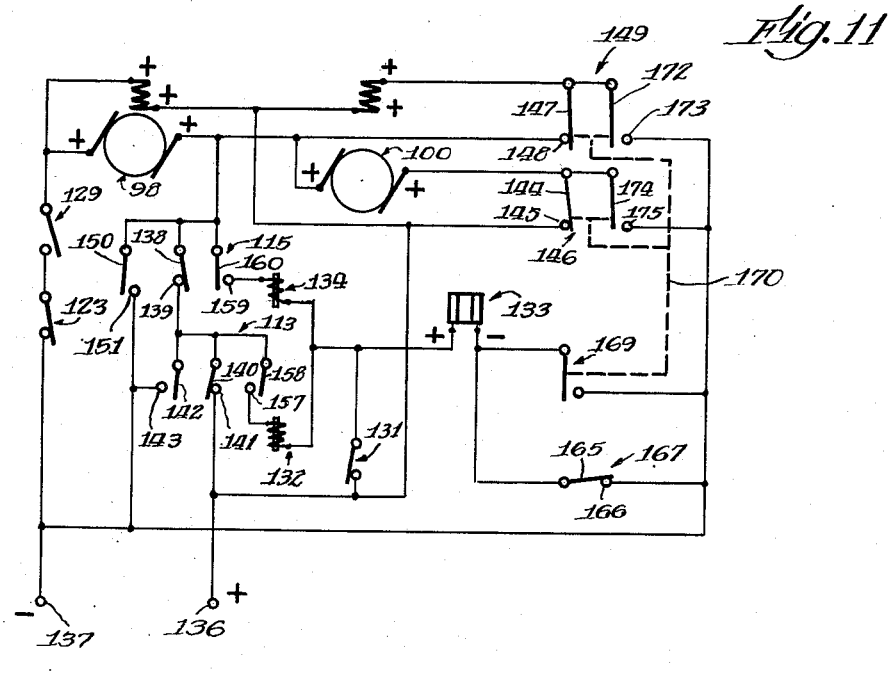

The next phase sets up conditions for reversing the transfer mechanism and placing the played record back in the magazine. It is represented by the circuit conditions disclosed in Fig. 11. This fifth phase is characterized by the termination of record play. At the end of record play, the contacts 165 and 166 of a tone arm switch 167 are brought together by the traversal of the tone arm radially toward the center of the record disc. This contact closes the energizing circuit of the winding of a relay 133. The circuit is traced from terminal 136, cam switch 131, the winding of relay 133, switch 167, and terminal 137. It will be noted that the only difference which exists between Figs. 10 and 11 is the closure of switch 167 at the termination of play of the record. Since the contact between elements 165 and 166 is limited to a brief interval, a holding circuit comprising switch 169, in parallel with switch 167, is provided. Switches 146, 149 and 169 are ganged and operate in unison as indicated by the dashed line 170. They are all contained in the same box with relay winding 133 and the function of this relay, when energized, is to throw these three switches from the positions illustrated in Fig. 11 to the positions illustrated in Fig. 12. This box is generally indicated by the numeral 171 (Fig. 1). The purpose of the action of the tone arm switch and the action of relay 133 in response thereto is to set up appropriate circuit conditions for reversing the transfer motor 100.

The sixth phase of circuit operation (Fig. 12) is characterized by reversal of the transfer motor and return of the played record disc to its original place in the record magazine. It will be observed that the circuit conditions are the same as those in Fig. 11 with the exception that the ganged switches 146, 149 and 169 have been thrown and that contacts 165 and 166 of switch 167 have separated. The transfer motor field is now energized through a circuit comprising terminal 136, contacts 172 and 173 of switch 149, and terminal 137. The armature of the transfer motor is energized through a circuit comprising terminal 136, contacts 140 and 141 of switch 113, contacts 138 and 139 of switch 115, contacts 174 and 175 of switch 146 and terminal 137. It will be noted that the restoration of switch 113 and 115 to normal also had the effect of permitting closure of the last mentioned circuit. Further, the polarity of the current through the transfer motor armature has been reversed with respect to that flowing under the conditions illustrated in Figs. 6, 7, 8, and 9, so that the transfer motor now runs in the reverse direction and so drives the transfer mechanism that the played record is gripped, returned to the record rack and released. Upon the termination of this final phase of operation, cam switch 131 opens, relay 133 is deenergized, switches 146, 149 and 169 return to their normal conditions illustrated in Fig. 11 and switch 129 is closed and the transfer motor stops, the result being that the quiescent circuit conditions illustrated in Fig. 4 again prevail. Should switch 123 happen to be closed by reason of actuation of one or more selector levers other than the one which occasioned the cycle of operation just described, then the cycle will be repeated until all of the selections ordered have been played.

Either of the pairs of contacts 138—139 (Fig. 7) of switch 115 and 140—141 (Fig. 6) of switch 113 constitutes circuit-breaking means carried by magazine 36 and responsive to abutment against a selector lever when it is in an actuated condition to stop the record rack motor 98 and arrest magazine motion. Either of the pairs of contacts 142—143 (Fig. 6) of switch 113 and 150—151 (Fig. 7) of switch 115 constitutes means cooperating with the last mentioned circuit-breaking means for dynamically braking the record rack motor and stopping the magazine. In another aspect, either of the pairs of contacts 142—143 (Fig. 6) of switch 113 and 150—151 (Fig. 7) of switch 115 constitutes switching means controlled by interaction of the selector 97 and the magazine 36 for energizing the transfer motor.

The means controlled by the transfer mechanism for resetting either of switches 113 or 115 and thereby stopping the transfer motor and the transfer mechanism constitutes either one of solenoids 132 or 134 taken with cam switch 131, which is actuated by the transfer mechanism to cause the appropriate one of those solenoids to be energized (Fig. 8 or Fig. 9). Switch 129 constitutes switching means included in the energizing circuit of the record rack motor 98 for opening that circuit and preventing operation of that motor (Figs. 8–12, inclusive, and Fig. 32) when the selected record is taken away from its transfer position, thereby assuring its return to its original place on the rack. The transfer motor 100 is reversed by the action of tone arm switch 167 which is cammed by the tone arm at the end of play of the record disc for energizing relay 133, whereby the switches 149, 146, and 169 are tripped to cause motor 100 to reverse and return the record to the rack (Figs. 11, 12 and 32). In another aspect, switch 131 comprises means controlled by the transfer mechanism for restoring switches 113 and 115 to normal and conditioning the transfer motor for reversed operation (Figs. 10–12) after the end of the record delivery phase, but for preventing such operation during the delivery phase.

Figure 12:
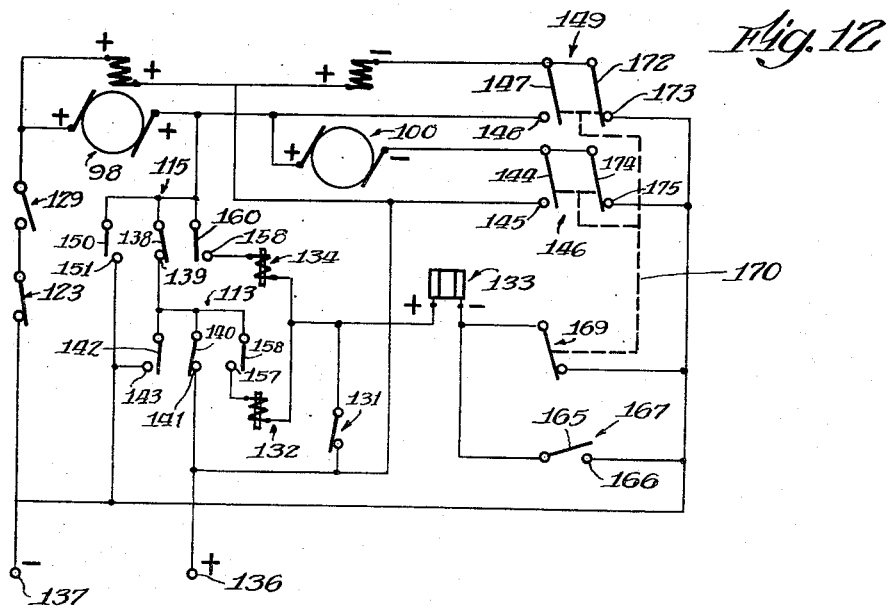

It is desirable to provide independent means for controlling the reversing circuits at the convenience of the operator, whereby a selected record may be canceled at will. We accomplish this objective by providing a manually operable switch 176 (Fig. 4), in parallel with the tone arm switch. When an operator desires to return a record to the rack, he closes switch 176 and the same results follow as are illustrated in Figs. 11 and 12, and as could have been caused by the closing of the tone arm switch 167. If, at the time a selection is made, the transfer mechanism should happen to be at the wrong one of its two terminal positions, so that cam switch 129 is open instead of closed, as it should be, the record rack motor would not run. This condition can easily be rectified by closing the cancel switch 176 for an instant and thus putting the transfer mechanism in such a condition that cam switch 129 is closed. In another aspect, switch 131 constitutes circuit-breaking means (Figs. 12, 4, and 32) controlled by the transfer mechanism for stopping the transfer motor 100 and the transfer mechanism at the end of the return movement and the redeposit of the record disc in the magazine.

It is additionally desirable to provide circuit-making and breaking means coupled to the record rack motor for moving the record magazine back and forth at the convenience of an operator, particularly a service man, to facilitate the placing of available selections in the magazine, even though no selection has been made by actuation of one of the selector elements. This is accomplished by another convenience feature which consists of a switch 177 in parallel with bail switch 123. Switch 177 is manually operable to move the record magazine at will. During normal operation of the record changer it is open (Fig. 4).

In accordance with an important feature of our invention, we provide a tone arm switch 167 having a weight 178 mounted on its flexible spring arm 180.

The switch has internal contacts 165, 166 (Fig. 4) which close when arm 180 is bent to the rear. Extension 180 of the tone arm (Figs. 1 and 18) closes this switch when it touches projection 179 on the weight. The normal operation of this switch 167 is such that when record play is completed, the switch is closed. However, should an attempt be made to defraud the machine by shaking it in an endeavor to return the tone arm to the beginning of a record groove and to obtain more than the number of selections paid for, inertia member 178 bends spring arm 180 whereby the tone arm switch 167 is closed. Such mechanical shocks so imposed on the record changer cause the record to be returned to the rack. Thus the invention frustrates such attempts to defraud.

It will be noted that the transfer mechanism, since it controls the operation of switches 129 and 131, permits the transfer motor to start and "tells it" when to stop upon record delivery.

Additionally, the tone arm "tells" the transfer mechanism when to reverse and the mechanism "tells" itself when to stop upon record return because of the action of the cam switch 131.

*The record magazine*

Reference is made specifically to Figs. 1 and 13 for a showing of the details of the record magazine. It is driven by record rack motor 98 acting through a gear reduction 185, a sprocket 186 and an endless roller chain 187, maintained in tension by another sprocket 188 mounted for rotation between suitable bearing posts secured to base 35. We prefer to run motor 98 counter-clockwise as viewed from the right and to arrange the drive so that the magazine moves toward the front under the Fig. 13 conditions. It has been found desirable, in order to insure accuracy of stop in the record magazine, to remove looseness in the record rack chain drive. This is accomplished by rigidly attaching a connecting rod 189 to the right hand base casting 190 of the magazine at 191 and by employing a spring steel member for the connecting rod 189, thereby at all times tensioning the record rack chain 187. This has the further advantage of eliminating a fulcrum pin at the point of connection 191. At the other end, rod 189 is pivotally secured to chain 187, as indicated at 192. The magazine comprises a pair of base members 190 and 193 secured together by front and rear plates 194 (Fig. 14) and 195 (Fig. 18). Each of the base members 190, 193 and each of the front and rear plates 194, 195 is apertured to permit slidable movement of the magazine on rods 196 and 197 and the rods are secured to base 35 by appropriate upstanding brackets 198, 199, 200 and 201 secured to base 35 (Figs. 1, 18 and 19). As clearly shown in Fig. 13 with respect to right hand base member 190, both of the base members are provided with slots at their sides to receive the opposed legs of a plurality of rectangular U-shaped record spacing and supporting members 205—225. These vertically arranged supporting members define twenty vertical disc compartments. As best shown in Figs. 18 and 19, there are provided two rubber record disc holding strips 226 and 227, each of which extends longitudinally of the record magazine, and each of which is glued to one of the base members of the magazine. Twenty grooves are formed in each one of these holding members, one for each record. There are also provided twenty-one holding members 228 and 231, the latter being disposed centrally of the U-shaped supporting members. In operation, each record contacts only the grooves in the lower rubber holding members, and a mating pair of the upper members 228 and 231.

Cross bar 118 is secured to front and rear plates 194 and 195 by screws (Figs. 18 and 19). The rectangular record supports insure entrance of each record between them at a point as close to the grippers as possible. This feature increases to a maximum the amount of record warpage which can be permitted without causing jamming. The rubber holding members are preferably so spaced as to reduce record disc warpage, incurred at high temperatures, to a minimum. The three-point type of record support minimizes jamming by warped records as they enter or leave the record magazine.

The vertical support members 205—225 are rigidly secured to the base members 193 and 199 by screws provided on either side, as shown by way of illustration at 232. Each such screw is secured to a land in the base member intermediate the slots, and the head of each screw is sufficiently large to overlie the support members, for example 206 and 207, on either side of the land and to maintain them in rigid assembly. It is important to note, as indicated in Fig. 13, that the spacing between the central planes of each of the record discs 37–56, inclusive, is the same as the spacing between the centers of the selector levers. Fig. 13 shows the left hand bank of selector levers as it appears when the right hand bank has been removed.

Reference is made to Figs. 14 and 15 for a detailed showing of the structures by which interaction of the selector levers and magazine switches is effected. Switch 113 is so constructed that depending member 237 strikes any actuated one of levers 57—76 when the magazine is moving toward the front and trips the switch, but slips over those levers, whether actuated or not, when the magazine is moving in the opposite direction. To this end member 237 is pivoted at 238 in such a way that it can rotate clockwise, as viewed from the right (Fig. 15) on that pivot but not counterclockwise. When member 237 strikes a selector lever, for example, lever 68, switch arm 239 is turned counterclockwise, as viewed from the right, on pivot 240 against the force of a spring (not shown) and pushes plunger 242 inwardly (toward front), tripping switch 113. Pivot 240 is mounted on switch housing 243. The circuit conditions produced when the switch is tripped by a selector lever are represented in Figs. 6 and 8. The normal circuit conditions to which the spring tends to force, and does force, the switch when the selector lever is restored to normal, are represented in Figs. 4, 5, 7, 9, 10, 11 and 12. Switches 113 and 115 may each be General Electric type CR1070C103-T3.

Similarly switch 115 is so constructed that depending member 245 strikes any actuated one of levers 77—96 when the magazine is moving toward the rear and trips the switch, but slips over those levers, whether actuated or not, when the magazine is moving in the opposite direction. Member 245 is pivoted at 246 in such a way that it can rotate counterclockwise, as viewed from the right, on that pivot but not clockwise. When member 245 strikes a selector lever, for example, lever 86, switch arm 247 (Fig. 14) is turned clockwise, as viewed from the right, on pivot 248, against the force of a spring (not shown) and pushes a plunger (not shown) inwardly (toward rear). Pivot 248 is mounted in switch housing 249. The construction of switches 113 and 115 is generally similar but they mechanically act in opposite directions. The circuit conditions produced when switch 115 is tripped by a selector lever are represented in Figs. 7 and 9. The normal circuit conditions to which the last-mentioned spring tends to force, and does so force, switch 115 when the selector lever is restored to normal, are represented in Figs. 4, 5, 6, 8, 10, 11 and 12. Switch housings 243 and 249 are mounted on a metal bracket 241 screwed on to the magazine front plate 194.

Referring now specifically to Figs. 14 and 17 it will be seen that solenoid 132 has a plunger 250, which when the solenoid is energized is lifted upwardly, turning lever 251, rotatably secured to the plunger at 252 and pivoted on front plate 194 at 253, counterclockwise, as viewed from the front, so that the striker 254, integral with lever 251, strikes any one of the actuated selector levers and turns it counterclockwise, as viewed from the front, to neutral. Fig. 14 shows in full lines the position of selector lever 68 when actuated and in dashed lines the position it assumes after striker 254 has restored it to normal. (See third phase of electrical operation.) When solenoid 132 is deenergized, plunger 250 falls and turns lever 251 clockwise, as viewed from the front, back to the position shown.

It is to be noted: First, that Fig. 15 is sectional, per line 15—15 of Fig. 14, and shows the left hand bank of selector levers, but that a fragmentary section of right-hand lever 68 is also shown, in order to simplify the description of the operation; Second, that, in Fig. 15, selector levers 57—67 and 69—76 are removed, to facilitate the description of operation.

The construction and operation of solenoid 134, and its plunger 255, lever 256, pivots 257 and 258, and striker 259 are generally similar to those of solenoid 132. Fig. 14 shows in dashed lines the position of selector lever 86 when actuated and in full lines the neutral position to which it is restored by striker 259 (see third phase of electrical operation). Solenoid 134 is likewise reset by gravity when deenergized.

*The selector mechanism*

As clearly shown in Fig. 1, the left-hand bank of selector levers 77—96 and their shaft 112 are mounted as one subassembly on a removable plate 260, secured by screws 261 (two in front, two in rear) to base 35. The levers do not move in unison but are mounted in one subassembly (see also Fig. 18.)

Similarly the right-hand bank of selector levers 57—76 and their shaft 111 are mounted as one subassembly on a removable plate 262, secured by screws 263 to base 35 (see also Fig. 15).

It has been noted that the record discs are maintained in spaced parallelism by the magazine subassembly.

Very important results are obtained by this construction. The magazine and selector lever subassemblies having been properly designed, no initial adjustment for each disc and each selector lever is required. Equality of spacing between the central planes of the records and the central axes of the selector levers has been obtained. Once the switches 113 and 115 are properly aligned, proper cooperation of selector and magazine is assured.

When a selection is made (Fig. 14) an electromagnet (for example, 265) is energized and the associated selector lever (for example, 68) is actuated. A spring (for example, 266) tends to maintain each lever in its existing condition, be it neutral or actuated. One spring is provided for each selector lever.

Fig. 16 shows electromagnets 267–274, individually associated with selector levers 83–90, inclusive. It will be understood that one electromagnet is associated with each and every selector lever. The operation and construction of a selector lever and an electromagnet per se are well known in this art and further description is unnecessary herein. Likewise, many electrical arrangements for causing one selection to be made and one selector lever to be actuated by electromagnetic action are conventional in this art, so that further details of the selecting means are not required herein. The left-hand magnets are supported as a subassembly on an L-frame 276 by screws 277. The right hand magnets are similarly mounted on an L-frame 278 by screws 279.

The L-frames 276 and 278 are secured to individual pairs of posts 260, 261, on plates 260, 262, respectively, by screws 282, 283 (the rear posts being shown in Fig. 14 and both of the front posts in Fig. 19).

The bail switch bars 121 and 122 are pivotally secured to plates 260, 262, respectively (Figs. 1, 13, 2, 14, 15, and 19). The inner faces of the selector levers are shouldered to support these bars (Fig. 14). In practice, we prefer to locate the bail switch 123 in the back rather than in front, as shown in Fig. 2. Any expedient for closing the energizing circuit of motor 98 when either of bars 121 or 122 is lifted and for breaking that circuit when both bars are down will be satisfactory. Further, any expedient (130, Fig. 3) for permitting the turntable motor 130 to run only when switch 123 is closed is acceptable. Such switches are well known in the art and are conventionally symbolically shown, so that further description is unnecessary.

The correspondence between the selector levers and the selections is as follows:

| Selection | Lever | Selection | Lever |
| --- | --- | --- | --- |
| 37F | 57 | 37R | 77 |
| 38F | 58 | 38R | 78 |
| 39F | 59 | 39R | 79 |
| 40F | 60 | 40R | 80 |
| 41F | 61 | 41R | 81 |
| 42F | 62 | 42R | 82 |
| 43F | 63 | 43R | 83 |
| 44F | 64 | 44R | 84 |
| 45F | 65 | 45R | 85 |
| 46F | 66 | 46R | 86 |
| 47F | 67 | 47R | 87 |
| 48F | 68 | 48R | 88 |
| 49F | 69 | 49R | 89 |
| 50F | 70 | 50R | 90 |
| 51F | 71 | 51R | 91 |
| 52F | 72 | 52R | 92 |
| 53F | 73 | 53R | 93 |
| 54F | 74 | 54R | 94 |
| 55F | 75 | 55R | 95 |
| 56F | 76 | 56R | 96 |

Whenever one or more of the forty selector levers are actuated, one or more of the forty available selections are played. It is fairly within the scope of this invention to provide a record changer with a greater or lesser number of available selections. It will now be apparent that Fig. 2 is an abbreviated showing of our record changer.

By reason of the above-described construction and interaction of record magazine and selector, additional advantages are enjoyed. One of the principal functions of the selector is selectively and accurately to relate the record rack to the transfer assembly and gripper arm. It is for this reason that the selector assemblies are so located as to actuate stopping switches which are mounted directly on the record rack.

Considerable effort has been devoted to solving the problem presented in accurately stopping the record rack. Since substantial masses are involved, it is considered desirable to provide a reasonable rate of retardation rather than to use an arrangement which would positively stop the record rack instantaneously, with resultant substantial undesirable impact forces. Dynamic braking of the record rack motor is a happy solution to this problem since the retardation forces are electromagnetic and are not so subject to variation during service life as are mechanical braking expedients. Additionally, this function is performed in a very simple manner. It has been experimentally determined that the record rack motor can be stopped from a speed of 2,000 revolutions per minute in one-half revolution, corresponding to a record rack travel of 0.04 inch. An important feature of the electric circuits is that the dynamic braking circuit is established by the snap type switches 113, 115 mounted on the record rack. And this circuit does not involve the actuation of a relay which would introduce aggravated errors in stopping.

The various assemblies may be replaced without making any adjustments. They are connected either by flexible mechanical elements or electrically. Prior-art mechanisms involve timing problems, in that the various components are related by gear trains and clutches which, if improperly assembled, do not provide proper relation of the various parts. In a record changer constructed in accordance with the invention, no timing problem arises, the only parts which are mechanically critically related to each other being the tone arm 103, the tone arm cam 104 and the cam switches 129 and 131, as will more fully appear in connection with the description of the transfer mechanism and the tone arm. As far as possible, subassemblies have been related electrically instead of mechanically in order to provide maximum flexibility. It may be urged that the degree of simplicity in mechanical construction which has been obtained by the solutions taught herein has been accomplished at the expense of increased electrical complexity. However, since automatic record changers are generally employed in phonographs which as a whole require a high degree of electrical skill in maintenance, no substantial electrical service burden has been added and the pressing problem of aggravated mechanical service problems has been radically lightened.

*The transfer mechanism*

The transfer mechanism is shown in Figs. 20 through 30. It performs the following functions:

A. On the record delivery stroke:
  (1) Grips the record;
  (2) Transports it clockwise, as viewed from the front, about an axis in a plane normal to the plane of the record in order to move it to the turntable;
  (3) Turns it either counterclockwise or clockwise as viewed from the top, about an axis in the plane of the record, in order to place either the front or the rear of the record, as desired, in horizontal playing position;
  (4) Places the record on the turntable at the end of these movements;
  (5) Releases the record.

B. On the record return stroke:
  (1) Grips the record;
  (2) Transports it counterclockwise back to the magazine;
  (3) Turns it in the reverse direction from that in which it was turned on delivery, in order to return it to its vertical storing position in the magazine;
  (4) Places the record back in the magazine at the end of these movements;
  (5) Releases the record.

The parts of the mechanism by which the record disc gripping and releasing functions are performed are first described. The transfer mechanism 99 is located centrally on base 35 (Fig. 1). It comprises a barrel 287, having the general shape of pipe-junction, rotatably mounted on a bifurcated pedestal 288 having upstanding journal posts 289 and 290 (Fig. 24). These posts are apertured to provide a bearing for a hollow tubular shaft 291 rotatably mounted within the pivotal (front-back) bore of the barrel. This shaft has two circular end bearing portions connected by two integral diametrically opposed intermediate portions 292, 293 (Figs. 25 and 26). Portions 292, 293 act as a rectangular cam, rotatably mounted in the pivotal axis of the barrel 287 (Fig. 29), for spreading tubular sleeves 294 and 295, rotatably and slidably mounted in the transverse bore of the barrel (Figs. 25 and 26). This cam is of the same length as the diameter of the transverse bore. Sleeve 294 is rigidly secured to the outer arcuate grooved record gripper member 120 by a clamp 299, and sleeve 295 is rigidly secured to the inner grooved gripper member 296. That is, sleeve 295 is rigidly fitted and secured to the coaxial tubular extension 297 of mushroom 298, and this extension is in turn rigidly keyed at 300 to a rectangular shaft 301. Shaft 301 is concentrically mounted in the transverse bore of the barrel. It passes freely between cam portions 292 and 293 (Fig. 29), and slidably through a complementary rectangular aperture in the closed end of sleeve 294 and is rigidly secured to the coaxial tubular extension 302 of inner gripper 296. The last named extension is slidably mounted within sleeve 294. A helical compression spring 303, mounted axially between the inner annular face of extension 302 and the opposed interior flange of sleeve 294, tends always strongly to force the sleeves 294 and 295 together and gripper 296 toward the end 304 (Fig. 18) of gripper 120, i. e., to force the grippers into record-gripping position. Now elements 296, 302, 294, 299, 303, 120, 295, 298, 297, 300, 301 always rotate in synchronism relative to barrel 287 and about the transverse bore axis of the barrel 287, but the rigid group of elements 120, 299, 294, is axially movable with respect to the other rigid group 296, 302, 295, 298, 297, 300, 301. In other words, the two groups have but one degree of limited freedom with respect to each other. Angular displacement between the groups is prevented by the fact that rectangular shaft 301 cannot turn relative to its rectangular aperture in sleeve 294. It will be seen that this rotational synchronism permits mushroom 298 to determine which side of a record will be placed on the turntable.

Fig. 25 shows the positions of the parts when a record is about to be grasped on the delivery stroke. The positions of cam portions 292 and 293 are such as to spread the grippers. Fig. 26 shows the conditions when the record has been grasped. Shaft 291 has rotated clockwise, as viewed from the front, and the high surfaces of the rectangular cam are now so positioned that spring 303 forces the grippers together. It is important to note that rotation of shaft 291 relative to the barrel, produced this effect. It follows that, if barrel 287 and its contents as a whole be further rotated clockwise, as viewed from the front, without rotating shaft 291 relative to the barrel, the record disc will remain securely gripped during transportation to the turntable. It also follows that, if, after the record is placed on the turntable, shaft 291 is rotated still further clockwise, as viewed from the front, relative to the barrel, cam surface 292 will then move sleeve 295 and cam surface 293 will then move sleeve 294, so that the record disc will be released by spreading of the grippers. In short, the gripping and releasing functions are accomplished by clockwise motions of shaft 291 relative to barrel 287, as viewed from the front at the beginning and end of the delivery stroke. Conversely, the gripping and releasing functions are accomplished by counterclockwise motions of the shaft 291 relative to barrel 287 and within its pivotal bore (Fig. 29) at the beginning and end of the return stroke.

The parts by which the record-disc transporting functions are accomplished and by which the last named motions are produced are next described.

Particular reference is made to Figs. 20, 21, 22, 23, 24, 27, 28, 29 and 30. Shaft 291 is rigidly secured to a gear 305 by a screw 306 (Fig. 29). Gear 305 is driven by a gear 307 (Fig. 30). Fig. 30 shows the relative positions of these gears near the beginning of the delivery stroke but at the end of the record-gripping portion of that stroke. Gear 307 is the origin of the motion train. At the beginning of the delivery stroke, gear 307 rotates clockwise, as viewed from the rear. Its leading abutment 308 cooperates with a complementary leading abutment 309 on gear 305 and turns the last-mentioned gear slightly counterclockwise, as viewed from the rear, before teeth 310 of gear 307 intermesh with teeth 311 of gear 305. During the interval between the abutment of elements 308, 309 and the intermeshing of teeth 310, 311, shaft 291 (Fig. 25) is rotated clockwise, as viewed from the front, from the position shown in Fig. 25 to the position shown in Fig. 26. Spring 303, since it tends by push-pull action to draw sleeves 294 and 295 together, cooperates in producing this result. Note that the spring alone is not relied upon to turn shaft 291, but cooperation of the spring and the action of abutments 308, 309 assures secure gripping of the record. Shortly after the time that teeth 310 of gear 307 mesh with teeth 311 of gear 305, teeth 310 (Fig. 27) also mesh with teeth 312 of gear 313. Gear 313 is mounted on shaft 291 in such a way that the shaft can rotate relative to it. Gear 313 is rigidly secured to barrel 287 by a pin 314 which is located radially inwardly of barrel 287 but outwardly of journal post 289 (Figs. 30 and 28). Preferable numbers of teeth are: fifteen for gear 307 (not including teeth 316 and 326); sixteen for gear 305 (not including depressions 327 and 317); twelve for gear 313, with a land at each peripheral end of the teeth.

Fig. 20 illustrates the motions of the parts in gripping a record disc. Continued rotation of gear 307 in a clockwise (as viewed from the rear) direction causes gear 313, gear 305, barrel 287, the contents of the barrel and the grippers 296 and 120 to rotate in a counterclockwise (as viewed from the rear) direction about the pivotal axis of the barrel from the position illustrated in Fig. 30 through the position illustrated in Fig. 21 and to the terminal position illustrated in Figs. 22 and 23. At the end of this phase of mechanical operation, gear teeth 310 clear gear teeth 311 and 312, the abutment of one of the slotted arms 320 or 321 of clamp 299 (Figs. 28 and 22) against a complementary stop 322, integral with pedestal 288 (Fig. 22) and the abutment of pin 314 (Fig. 28) against stop 315 on pedestal portion 289 (Fig. 1) stop the motion of gear 313 and further transportation of the record disc. In Fig. 22 slotted arm 320 of clamp 299 is shown in abutment with stop 322 (when the front side of a record is placed in playing position, slotted arm 321 strikes stop 322).

However, the motion of gears 305 and 307 and the transfer motor continues until the trailing abutment portion 323 of gear 305 almost strikes a complementary trailing abutment portion 324 of gear 307. In other words, gear 305 continues its rotation for a slight interval after gear 313 has ceased to rotate. This is accomplished by the arcuate projecting tooth 316, which bears on the curved side of arcuate depression 317, so that gear 307 continues to turn gear 305 after gear 313 has stopped. Elements 316 and 317 constitute an over-center driving means. During this interval, cam portion 293 moves sleeve 294 and cam portion 292 moves sleeve 295 (Fig. 25). As indicated above, the purpose of this additional clockwise (as viewed from the front) rotation of gear 305 and shaft 291 relative to barrel 287 is to spread the grippers 120, 296 and to release the record when it is on the turntable.

The maintenance of a firm grip during transportation of the record from the rack to the turntable is assured for the reason that during the synchronized rotation of gears 305 and 313 relative rotation of shaft 291 and barrel 287 is positively prevented.

On the record return stroke, the following events occur: Gear 307 starts to turn counterclockwise, as viewed from the rear (Fig. 30), cam surface 324, abutting cam surface 323, forces gear 305 to turn, so that shaft 291 turns clockwise, as viewed from the rear, and again assumes the position shown in Fig. 26; the played record disc is grasped by grippers 296 and 120; teeth 310 on gear 307 engage teeth 311 on gear 305 and then teeth 312 on gear 313 and cause both gears 305 and 313 to turn, so that barrel 287 is also turned clockwise, as viewed from the rear, while the record disc remains firmly grasped; end 304 of gripper 120 comes to rest against stop 325 (Figs. 18 and 19); teeth 310 disengage teeth 311 and 312 and gear 313 stops; gears 307 and 305 continue to run until surfaces 308 and 309 almost touch, whereby shaft 291 continues to rotate clockwise, as viewed from the rear, and finally assumes the position shown in Fig. 25 to spread the grippers 120, 296; the record disc is thus returned to its compartment and released. An over-center driving means comprising arcuate projecting tooth 326 in gear 307 and a complementary arcuate depression 327 in gear 305 is provided, thus assuring ultimate close clearance between surfaces 308, 309 at the end of this record-return phase, and continued motion of gears 307 and 305 after gear 313 has stopped.

It will be observed that gear 305 always turns before gear 313 and continues to turn after gear 313 has stopped. This action assures gripping of the record disc at the beginning of each stroke and release at the end. A stop pin 329 (Fig. 29) is provided in order to prevent possible overruns of the transfer mechanism. Pin 329, fitted in an aperture in journal arm 289, is struck by one side of pin 330, integral with gear 307, at the end of the record-return phase of operation. Pin 329 is struck by the other side of pin 330, at the end of the record-delivery phase of operation. Gear 307 rotates more than three hundred and forty degrees during its cycle of operation, while gear 313 rotates on the order of one hundred and eighty degrees.

The over-center effects are obtained by slipping of the surfaces 326—327 and slipping of the surfaces 316—317.

When barrel 287 is moving, the eighth tooth of gear 307 is between the sixth and seventh teeth of gear 313 and between the eighth and ninth teeth of gear 305. At the end of record return the first regular tooth on gear 307 does not engage any of teeth 312 at all, being of narrower width than the other teeth 310. This first tooth passes clear of flange 331 (Fig. 29). Similarly, at the end of record delivery, the last regular tooth on gear 307 does not engage any of teeth 312 and passes clear of flange 331.

In short, record disc transportation and delivery to the turntable are accomplished by clockwise, as viewed from the front, rotation of gear 313 and barrel 287 during the record delivery stroke. Conversely, record disc take-off from the turntable and return to the rack are accomplished by rotation of that gear and the barrel during the record return stroke, in a counterclockwise direction, as viewed from the front.

Thus it will be seen that there are herein disclosed in a record changer mechanism of the type including a pair of gripper members 296, 120, a pivotally mounted barrel 287, two sleeve members 294, 295 for actuating the gripper members and slidably mounted in the barrel, means including a first gear 305 and a cam 291, 292, 293, mounted for axial rotation relative to the barrel for contracting or releasing the grippers, a second gear 313 concentric with the first gear 305 and rigidly secured to the barrel 287 for rotating the barrel about its pivotal axis, a third and driving gear 307 for joint or several rotation with the first and second gears 305 and 313, said first (305) and third (307) gears having cooperating leading (309, 308) and trailing (323, 324) abutments and cooperating teeth (311, 310) and over-center driving means (326—327, 316—317) intermediate those abutments, said second gear 313 and said third gear 307 having cooperating teeth (312, 310), whereby an initial rotation of said third gear causes the leading abutment 308 to cooperate with the leading abutment 309 on said first gear 305 to turn said first gear alone and to contract said grippers on a record, whereby further rotation of said third gear 307 causes its gear teeth 310 to engage the gear teeth (311, 312) on said first and second gears and to turn both of said gears and said barrel about the pivotal axis of the barrel until the gear teeth on said third gear clear the teeth on said first and second gears, thereby imparting motion to a gripped record while at the same time preventing rotation of the first gear (305) relative to the barrel 287, means (299, 314, 315, 322) for limiting the motion of the second gear 313, said first (305) and third (307) gears continuing to turn and to be driven over center relative to said second (313) gear to release said grippers when said record has been moved to a desired position and until their trailing abutments 323 and 324 almost touch, said leading and trailing abutments being adapted to interchange functions whereby when the direction of rotation of said third gear is reversed, a record disc is gripped and moved from the turntable back to the rack.

Reference is now made specifically to Figs. 20, 21, 22, 23, 24, 27, 28, 29 and 30 in describing the parts of the transfer mechanism by which the record-disc turning functions are performed. As noted above, mushroom 298 determines which side of a record will be placed on the turntable, for the reason that mushroom 298, grippers 120 and 296 and the mushroom-gripper subassembly are mounted for independent limited rotation about the transverse bore of barrel 287. During the record delivery phase, the transfer mechanism parts progress from the position shown in Figs. 20, 27, 28, 29 to that shown in Fig. 30, then through the position shown in Fig. 21 to the position illustrated in Figs. 22, 23 and 24. Independent rotation of the mushroom 298 relative to barrel 287 is initially restrained during the record-delivery phase by element 322 (Figs. 27, 29, 20) cooperating with groove 332 in the mushroom. After the Figs. 22, 23, 24 positions are attained, the record disc is released.

At a later time during that phase, one of pins 333, 334 enters its appropriate one of the cam grooves 335, 336 of mushroom 298, as clearly shown in Fig. 21, and groove 332 clears the guiding element 322. The entry of pin 333 into groove 335 causes the grippers to rotate, independent of barrel 287, in a counterclockwise direction as viewed from the top. Similarly, the entry of pin 334 into groove 336 causes the grippers to be turned in a clockwise direction as viewed from the top. Therefore, the rear side of a selected record is to be played when pin 333 is projecting into one (335) of the cam grooves on the mushroom and the front side of the record is played when pin 334 is projecting into the other groove 336. As hereinabove indicated, the operation of the cross bar 118 of the magazine 36 and the tail 116 of rocker plate 114 is such that when the magazine 36 is moving toward the rear, the rocker plate is in the counterclockwise position (viewed from top) as shown in Fig. 27. The description now proceeds on the assumption that pin 333 is projecting into groove 335. Continuation of the delivery phase following the conditions illustrated in Fig. 21 causes pin 333, which has established a smooth line contact with the outer or front surface of the groove 335, to approach the terminus 337 of that groove, to exert a torsional force relative to an axis in the plane of the record disc (i. e., the transverse bore axis of barrel 287); and to impart to the subassembly of mushroom and grippers a counterclockwise turn as viewed from the top. Still further movement of barrel 287 causes the opposite or normally inner surface of groove 335 to come into contact with pin 333, and at the end of the record delivery stroke the transfer mechanism parts assume the positions illustrated in Figs. 22, 23, and 24. It will be seen that pins 333 and 334 and grooves 335 and 336 converge at a common locus, so that the action of the pin and mushroom is equivalent to bevel gearing.

Reversal of barrel 287 during the record return phase causes a clockwise rotation relative to the transverse bore axis of the barrel, as viewed from the top, to be imparted to the mushroom and gripper subassembly.

The operation of the mushroom and gripper subassembly when pin 334 is projecting into groove 336 is apparent from the foregoing description. In that case, the record is turned clockwise about an axis in its plane, as viewed from the top, on the delivery stroke and counterclockwise, as viewed from the top, on the record return stroke.

The rocker plate 114 is pivotally mounted (Fig. 24) at 339 on the pin block 340, secured to pedestal 286. The pin block has two integral cylinders 341 and 342 and the converging pins 334, 333, tend to be biased outwardly in the direction of divergence by compression springs 343, 344, respectively. One of the pins is pressed and secured inwardly by the adjacent curved surface of one of the overlying arms 345, 346 of rocker plate 114 when the other pin is outwardly biased. The rocker arms are so arranged that they are rotatable positively to force and retain either of the pins toward the mushroom 298. Thus it is apparent how the record-disc turning functions are performed and how the playing of either the front and the rear side of the record is made dependent upon the direction of magazine motion.

Each of the pins 333, 334 which determine the side of a selected record to be played is essentially one tooth of a hypothetical bevel pinion which would mate with a similar hypothetical tooth on the mushroom. The principal advantage of this characteristic of a bevel gear drive is that line contact exists throughout the phase of operation during which the cam grooves and pins come into play, thus obviating the short duration if merely point contact existed. With this construction of converging pins, the initial contact of the pins is angular with respect to the contact surfaces 335, 336 and impacts are substantially reduced below those which would otherwise prevail. The maximum acceleration imposed on the record in making the necessary ninety degree twist has been kept to a minimum which is considerably below that developed in prior-art record changers.

Power is applied to driving gear 387 by its rigidly fitted shaft 347 (Fig. 29), which is in turn driven by transfer motor 100 through a gear reduction 348, a sprocket 349, a roller chain 350, and a sprocket 351 (Fig. 1).

*The tone arm, the tone arm cam, and cam switches*

As clearly shown in Figs. 1 and 18, the tone arm 103 is rigidly secured to a generally L-shaped extension 354 and that extension is rigidly secured to a hollow post 355 (Fig. 18), pivotally mounted on an upstanding shaft 356, tightly fitted into an aperture on base 35. The tone arm and its extension 354 are swingably movable in planes generally parallel to the base 35 to permit the phonograph needle 357 to traverse the groove in any record being played and elements 103, 354, are movable in a vertical or "up and down" direction by reason of the longitudinal slidability of post 355 with respect to shaft 356. The extension 354 and its depending pins 358 and 359 constitute a cam follower with respect to the tone arm cam 104 and the movements of the cam and its follower govern the positioning of the tone arm.

Figs. 31, 32, and 33 show in full lines the positions of cam 104 and the cam follower pins at the initiation of record play and in dashed lines their positions before the initiation of the record-delivery phase of transfer mechanism operation. As clearly shown in Figs. 29 and 31, cam 104 is rigidly mounted by a tongue and groove arrangement 360 on the common shaft 347 with gear 387 and it turns in synchronism with that gear, the ultimate power being furnished by the transfer motor. The overall operation of the tone arm is such that needle 357 is placed on a record to be played at the end of the record-delivery phase and removed from a played record at the beginning of the record-return phase.

During the record-delivery phase, these events occur: The shaft 347 and cam 104 turn counterclockwise, as viewed from the front, and the rear surface of the cam, bearing against pin 358, initially keeps the tone arm radially displaced from the turntable. Upon continued rotation of cam 104, its axially extending front cam surface 361 forces pin 359 toward the front and the tone arm horizontally toward the turntable. Additionally, a gradually rising radial cam surface 362, bearing on the bottom of extension 354, forces the tone arm upwardly as it moves over to the turntable, until the highest point 363 of the cam surface 362 is reached, at which time the tone arm drops and the needle is placed at the beginning of the record groove. At the beginning of record play, the pin 358 is at a considerable distance from the narrow section 365 of the cam 104 and the tone arm is free to turn as the needle 357 and the tone arm radially traverse the record disc during play. It will be understood that cam 104 remains stationary throughout the playing of the record. Because of the necessity of providing the narrow trailing section 365 of cam 104, which permits play between the follower comprising pins 358 and 359 and the cam 104 and free swinging of the tone arm when the latter is in record-playing position, this play would also exist for a relatively long undesired interval preceding the time of beginning of record play as cam 104 is rotated counterclockwise, as viewed from the front, were that interval not minimized. This is accomplished by a trailing leaf spring 366, disposed across the greater length of the narrow cam section 364 which terminates at 365. This spring 366 constitutes a broad false cam surface, pushing pin 359 to the rear and restricting play between the cam follower and section 365 as cam 104 turns counterclockwise, as viewed from the front, until pin 358 clears spring 366. This clearance occurs just as record play is initiated. The leaf spring stabilizes the tone arm so that even if base 35 is not substantially horizontally mounted, record play will not be started at a point on the record later than the beginning of its groove. This leaf-spring expedient prevents undesired gravitational influences from so acting on the tone arm as to cause record play to be started in the middle of a record.

Considering now the events which occur during the record return phase of the transfer mechanism operation: As cam 104 turns clockwise, as viewed from the front, rear cam surface 364 pushes pin 358 to the rear and causes the tone arm to move radially away from the turntable, while point 363 of cam surface 362 lifts the tone arm cam follower up from the turntable. As the clockwise turn of cam 104 continues, the increasing slope of cam surface 364 bears against pin 358 while the bottom of extension 354 rides along the decreasingly high cam surface 362. The radial distance of surface 362 from the axis of shaft 246 is constantly decreasing as cam 104 turns clockwise, as viewed from the front. During this clockwise turn of cam 104, pin 358 passes between spring 366 and section 365 and does not pass to the rear or outside of spring 366 as it does during the record delivery phase. Spring 366 is rigidly secured to the rear side of cam 104 by screws 367 on integral portion 372 of cam 104. The spring lies parallel a plane normal to shaft 347 and is generally arcuate in form as viewed from the rear (Fig. 18). Its integral doubled-back portion overlies most of section 365.

Cam 104 has two additional cam surfaces which perform important functions. As clearly shown in Fig. 32, high cam surface 368 causes switch 129 to open and switch 131 to close at the end of the record delivery phase. Similarly, low cam surface 369 causes switch 129 to close and switch 131 to open when the transfer mechanism is in the proper position for beginning the delivery of a record from the rack to the turntable. Cam surfaces 268 and 369 are adapted to bear on a resilient tripping device 370 and that switch tripping device is so arranged that the surface 371 intermediate cam surfaces 368 and 369 does not effect the circuit conditions of switches 129 and 131. Therefore, switch 129 is closed and 131 is opened at the beginning of record delivery (i. e., when element 370 bears on cam surface 369). These circuit conditions continue during the time that elements 370 and 371 are in contact and as cam 104 moves counterclockwise, as viewed from the front, until 370 touches element 368, at which time switch 129 opens and switch 131 closes, introducing different circuit-conditions. Similarly, during the record-return phase, the last-mentioned circuit conditions continue, as cam 104 rotates clockwise, as viewed from the front, until element 370 touches element 369, at which time switch 129 closes and switch 131 opens. The electrical effects following the operation of these switches have been described hereinabove with the other electrical circuits. Microswitches, which utilize the displacements of tripping devices such as element 370, are well known to those skilled in the art and need not be further described. A General Electric type CR1070C117-C3 double circuit switch is satisfactory for switches 129 and 131.

Having fully described the construction of a record changer provided in accordance with our invention and the detailed construction and operation of its various parts, we conclude this specification with a brief summary of a typical cycle of operation:

Cycle of operation

It is assumed, for purposes of illustration, that a customer desires to hear selections 40R and 38F, that the position of the magazine 36 is as shown in Fig. 1 and that the position of pivot 192 is on its upper level as shown in Fig. 13. The customer deposits a dime, say, in a coin collecting and credit unit (not shown), establishes a credit of two monetary units, depresses two push buttons (not shown) and causes selector levers 80 and 58 to be actuated. Bail switch bars 121 and 122 are lifted and switch 123 is closed (Fig. 2). The record rack motor 98 runs (Fig. 5) and the magazine 36 moves toward the front. Further, expedient 130 (Fig. 3) causes turntable motor 102 to start and the turntable 101 operates. Motion is imparted to the magazine through gear reduction 185 (Fig. 1), sprocket 186, chain 187, pivot 192, connecting rod 189, connection 191 and base member 190 (Fig. 13). As the magazine moves forward depending members 237 and 245 pass over the selector levers (Fig. 14). At the end of the forward travel of the magazine end 117 of cross-bar 118 strikes tail 116 of rocker plate 114 and forces the latter to its counterclockwise position (Fig. 2) as viewed from the top, permitting pin 233 to project inwardly (Fig. 20) and setting up conditions for placing the rear side of a selected record in playing position. Pivot 192 passes sprocket 186 and then goes toward the rear (Fig. 13) so that the magazine moves toward the rear. Depending member 245 (Fig. 14) of switch 115 strikes selector lever 80 and the record rack motor and magazine stop (Fig. 7). Record 40 has attained the transfer position.

It will of course be understood that the initial motion of rack 36 is toward the front if the pivot 192 is on the upper run, as shown in Fig. 13. When that pivot is on the bottom run, the rack moves toward the rear.

Then three groups of events occur as the record is delivered to the turntable. These groups are designated: "Transfer mechanism events," "Electrical events," "Tone arm events."

The transfer mechanism events are as follows: Power is applied to shaft 347 from transfer motor 100, through sprocket 349, chain 350 and sprocket 351 (Fig. 1). Gear 307 turns counterclockwise, as viewed from the front (Fig. 30). Surfaces 308—309 cooperate to turn gear 305 clockwise, as viewed from the front. Shaft 291 turns and sleeves 294—295 are pushed together by spring 303 (Fig. 25), forcing grippers 120, 296 together, whereby the record is securely gripped (Fig. 26). Teeth 310 pick up teeth 311 and 312 (Fig. 29) and barrel 287 is rotated clockwise, as viewed from the front, transporting the record toward the turntable. As the barrel is rotated, guide 322 (Fig. 29) and groove 332 keep gripper 120 in the vertical plane until pin 333 enters groove 335 in mushroom 298 (Fig. 24). Then the grippers and record are turned counterclockwise as viewed from the top (Fig. 21), so that the rear side of the record is placed in playing position. Finally slotted arm 320 embraces element 322 (Figs. 22 and 23) and gear 313 and barrel 287 stop as end 304 of gripper 120 strikes rest (Fig. 1) 154. Gears 307 and 305 continue to run until the record is released by the grippers arm 320 slipping on element 322 as the record is released. The record is now on the turntable.

The electrical events are as follows: The transfer motor 100 is started as switch 115 is tripped and the record rack motor 98 is stopped and braked (Fig. 7). As the record is placed on the turntable, cam 104 attains the end of its counterclockwise, as viewed from the front, motion and tripper 370 is actuated by cam surface 368 (Figs. 32 and 9). Switch 129 opens and switch 131 closes. Solenoid 134 is energized and striker 259 (Fig. 14) restores selector lever 80 to neutral. Switch 115 is reset (Fig. 10) and the transfer motor stops when the record has been released.

The tone arm events are as follows: As cam 104 moves counterclockwise, as viewed from the front, cam surfaces 361 and 362 cooperate to push the cam follower 359, 358, 354 (Figs. 31–34 and 29), upwardly and toward the turntable. Leaf spring 366 stabilizes the tone arm until pin 358 clears it just before needle 357 is placed at the beginning of the groove of record 40R. The tone arm drops as the bottom of extension 354 clears the highest point 363 of cam 362.

The record is played and the tone arm traverses the disc, post 355 swinging freely on shaft 356 (Fig. 18) and pin 358 (Fig. 31) moving toward section 365. Finally the tone arm switch 161 (Fig. 11) is closed (Figs. 1 and 18) and relay 133 energized, so that the transfer motor 100 (Fig. 12) is reversed.

Then the record 40 is again gripped as gear 307 turns clockwise, as viewed from the front, its surface 324 cooperating with surface 323 of gear 305 to turn that gear 305 counterclockwise, as viewed from the front. Shaft 291 is also turned and the grippers are closed. Teeth 310 again pick up teeth 311 and 312 and barrel 287 is turned about its pivotal axis. Further, pin 333 and groove 335 on mushroom 298 cooperate to twist the record clockwise as viewed from the top and the record is returned to the rack and released. As end 304 of gripper 120 strikes rest 325 gear 313 stops. Gear 305 (Fig. 30) continues its counterclockwise, as viewed from the front, motion long enough to release the grippers and to bring surfaces 308, 309 together. The transfer motor stops.

The tone arm is removed at an early stage of the record-return phase, the tone arm being lifted upwardly as point 363 on cam surface 362, moving clockwise, as viewed from the front, lifts extension 354 (Figs. 31, 33 and 29), and the tone arm being pulled away from the turntable by the action of cam surface 364 and pin 358.

At the end of this phase (Fig. 12) cam switch 131 is opened and cam switch 129 is closed (Fig. 4) as tripper 370 snaps into low cam surface 369 (Fig. 32). The transfer motor stops.

Switch 123 (Figs. 2 and 4) is still closed and when the cam switch 129 closes the cycle starts again. The record rack 36 moves toward the rear. At the end of its rearward travel, end 119 of cross-bar 118 strikes tail 116 and forces rocker plate 114 to its clockwise position (Fig. 2), as viewed from the top, so that pin 334 now projects inwardly, setting up conditions for placing the front side of the second selected record in playing position. Then switch 113 is tripped as projecting member 237 strikes selector lever 58 (Fig. 14). The transfer function is now performed, solenoid 132, switch 113, pin 334 and groove 336 (Figs. 6, 8, 10) performing the functions performed by solenoid 134, switch 115, pin 333 and groove 335 during the cycle just described, the record 38 being twisted clockwise, as viewed from the top (Fig. 21) so that selection 38F is placed in playing position. After the selection 38F is played the record-return function is performed. Switch 123 was opened as solenoid 113 restored selector lever 58 to neutral, since all the levers are now in neutral. When record 38 is returned to the magazine, switch 129 is closed and the whole record changer assumes a quiescent condition. This condition continues until one or more of the selector levers are actuated in response to a new order.

While there has been described what is at present, after a considerable exercise of the inventive faculties and expenditure of time, mechanical and electrical ingenuity, labor and materials, considered to be the preferred embodiment of the present invention, it will be obvious to those skilled in the art that various changes and substitutions of equivalents may be made without departing from the true scope of the invention and it is, accordingly, intended in the claims appended hereto to cover all such changes and modifications as fall within the true and proper scope of the invention and to obtain protection appropriate to our contribution to the art. For example, while an automatic phonograph is a particular type of vending machine and while it raises the problem of aligning a selected record disc with a transfer mechanism and turntable which perform a particular vending operation thereon, the magazine being movable, our invention is adapted to be employed in any vending machine wherein the problem is to align a selected one of a number of spaced articles with any mechanism for performing a vending operation thereon, whether this problem is solved by movement of the magazine or by movement of that mechanism. Relative linear motion between the magazine and the mechanism is an essential and is herein fully shown. Therefore, our invention fairly embraces, in a vending machine, the combination of a selector comprising a plurality of normally neutral spaced parallel levers 57—76, a magazine 36 supporting a plurality of identically center-to-center spaced articles adapted to have a vending operation performed thereon, a mechanism (99, 101) for performing a vending operation thereon, means (98, 186, 187, 188, 189, 191) for producing linear motion between said mechanism and magazine and means (113 and associated circuits) cooperating with any actuated one of said levers for arresting said motion when the spaced article corresponding to that lever is in alignment with said mechanism.

We desire such a construction of our claims as will best secure and protect the true invention.

Having thus described our invention, we claim:

1. In a record changer, a selector comprising a plurality of pivotally mounted parallel levers normally positioned in one plane, a magazine carrying a plurality of spaced parallel phonograph records, an electric motor for reciprocally moving said magazine relative to said selector, and means carried by said magazine adapted to be engaged by one of said levers displaced from said plane for stopping said electric motor and said magazine, said means including an electric circuit for dynamically braking said motor.

2. In a record changer of the type including a magazine, a tone arm and a tone arm switch responsive to movement of said tone arm, and means controlled by said switch for returning a record to a magazine, an inertia member mounted for free swinging movement and mechanically coupled to said switch for closing said switch independently of movement of the tone arm in response to undesired mechanical shocks imposed on said changer.

3. In an automatic phonograph, in combination, a record selector and a record magazine mounted for relative reciprocating transverse movement with respect to each other; the magazine having means for supporting a multiplicity of disk records in face-to-face relationship, and the selector including a multiplicity of selector levers each shiftable between an operative and an inoperative position and arranged in side-by-side relation in two parallel banks, with the banks of levers longitudinally disposed with respect to the magazine; with individual electromagnets operatively associated with each of said levers and adapted when energized to shift any one of said levers from inoperative position to operating position wherein a portion of the lever projects beyond a plane defined by the surfaces of the levers in inoperative position, and with toggle spring mechanisms for holding the levers individually in operative or inoperative position; a bail bar extending over each bank of selector levers and electrical switch means operatively connected with said bail bars and responsive to the movement of any one of the selector levers to operative position; a pair of cooperating electrical switches mounted on the magazine and adapted to control the reciprocating movement thereof; one of said switches having an actuating lever adapted to traverse one bank of selector levers and the other switch having an actuating lever adapted to traverse the other bank of selector levers, with an overrunning unidirectional trigger on each of said actuating levers whereby one switch is actuated by moving in one direction over a selector lever in operative position, and the other switch is actuated when moved in the opposite direction over a selector lever in operative position.

4. In an automatic phonograph, in combination, a record selector and a record magazine mounted for relative reciprocating transverse movement with respect to each other; the magazine having means for supporting a multiplicity of disk records in face-to-face relationship, and the selector including a multiplicity of selector levers each shiftable between an operative and an inoperative position and arranged in side-by-side relation in two parallel banks, with the banks of levers longitudinally disposed with respect to the magazine; a pair of cooperating electrical switches mounted on the magazine and adapted to control the reciprocating movement thereof; one of said switches having an actuating lever adapted to traverse one bank of selector levers and the other switch having an actuating lever adapted to traverse the other bank of selector levers, with an overrunning unidirectional trigger on each of said actuating levers whereby one switch is actuated by moving in one direction over a selector lever in operative position, and the other switch is actuated when moved in the opposite direction over a selector lever in operative position.

5. In an automatic phonograph, in combination, a record selector and a record magazine mounted for relative reciprocating transverse movement with respect to each other; the magazine having means for supporting a multiplicity of disk records in face-to-face relationship, and the selector including a multiplicity of shiftable selector levers arranged in side-by-side relation and longitudinally disposed with respect to the record carrier, with individual electromagnets operatively associated with each of said levers and adapted when energized to shift any one of said levers from inoperative position to an operating position wherein a portion of the lever projects above a plane defined by the surfaces of the levers in inoperative position; means for holding the levers individually in operative or inoperative position, a bail bar extending over each of the selector levers and electrical switch means operatively connected with said bail bar and responsive to the movement of any one of the selector levers to operative position, and with electrical switch means mounted on the magazine and adapted to control the reciprocating movement thereof; said switch having an actuating lever adapted to traverse the selector levers and having an overrunning unidirectional actuating trigger whereby said switch is actuated by any selector levers in operative position in response to movement thereover in one direction only.

6. In an automatic phonograph, in combination, a record selector and a record magazine mounted for relative reciprocating transverse movement with respect to each other; the magazine having means for supporting a multiplicity of disk records in face-to-face relationship, and the selector including a multiplicity of shiftable selector levers arranged in side-by-side relation and longitudinally disposed with respect to the record carrier, with means to shift any one of said levers from inoperative position to an operating position wherein a portion of the lever projects above a plane defined by the surfaces of the levers in inoperative position; means for holding the levers individually in operative or inoperative position, and with electrical switch means mounted on the magazine and adapted to control the reciprocating movement thereof; said switch having an actuating lever adapted to traverse the selector levers and having an overrunning unidirectional actuating trigger whereby said switch is actuated by any selector levers in operative position in response to movement thereover in one direction only.

H. HERBERT VANDERZEE
ROBERT A. McCALLUM

References Cited in the file of this patent

UNITED STATES PATENTS

| Number | Name | Date |
|---|---|---|
| 575,573 | Preper et al. | Jan. 19, 1897 |
| 1,444,089 | Spengler | Feb. 6, 1923 |
| 1,590,654 | Smith | June 29, 1926 |
| 1,772,901 | Kenyon | Aug. 12, 1930 |
| 1,907,500 | Chiffey | May 9, 1933 |
| 1,968,245 | Bussoz | July 31, 1934 |
| 2,047,749 | Small | July 14, 1936 |
| 2,063,573 | Yeider | Dec. 8, 1936 |
| 2,104,032 | Green | Jan. 4, 1938 |
| 2,183,607 | Ebert et al. | Dec. 19, 1939 |
| 2,240,609 | Cummings | May 6, 1941 |
| 2,281,548 | Andrews | May 5, 1942 |
| 2,402,150 | Dale | June 18, 1946 |
| 2,406,355 | Darwin et al. | Aug. 27, 1946 |
| 2,434,033 | Cain | Jan. 6, 1948 |
| 2,531,374 | Andrews | Nov. 21, 1950 |